United States Patent [19]

Islam

[11] Patent Number: 5,778,014
[45] Date of Patent: Jul. 7, 1998

[54] SAGNAC RAMAN AMPLIFIERS AND CASCADE LASERS

[76] Inventor: Mohammed N. Islam, 2717 Holyoke La., Ann Arbor, Mich. 48103

[21] Appl. No.: 773,482

[22] Filed: Dec. 23, 1996

[51] Int. Cl.[6] .............................. H01S 3/30; H01S 3/00; G01B 9/02; G02B 6/00
[52] U.S. Cl. ........................... 372/6; 372/92; 372/94; 372/96; 372/97; 372/99; 372/106; 372/21; 372/22; 356/345; 359/345; 359/346; 385/122; 385/42
[58] Field of Search ................... 372/21, 22, 6, 372/27, 28, 39, 92, 94, 96, 97, 99, 106, 3; 356/345; 359/115, 127, 133, 134, 333, 341, 345, 346; 385/39, 42, 122, 47

[56] References Cited

U.S. PATENT DOCUMENTS

| | | | |
|---|---|---|---|
| 4,530,097 | 7/1985 | Stokes et al. | 372/6 |
| 4,794,598 | 12/1988 | Desurvire et al. | 372/3 |
| 4,867,518 | 9/1989 | Stamnitz et al. | 385/42 |
| 5,050,183 | 9/1991 | Duling, III | 372/94 |
| 5,191,628 | 3/1993 | Byron | 385/27 |
| 5,323,404 | 6/1994 | Grubb | 372/6 |
| 5,359,612 | 10/1994 | Dennis et al. | 372/18 |
| 5,497,386 | 3/1996 | Fontana | 372/18 |
| 5,504,771 | 4/1996 | Vahala et al. | 372/94 |
| 5,513,194 | 4/1996 | Tamura et al. | 372/6 |
| 5,530,710 | 6/1996 | Grubb | 372/3 |
| 5,577,057 | 11/1996 | Frisken | 372/18 |
| 5,673,280 | 9/1997 | Grubb et al. | 372/3 |

OTHER PUBLICATIONS

"Other Types of Fiber Amplifiers," Gain, Saturation, and Noise Characteristics of Erbium–Doped Fiber Amplifiers, pp. 440–412 and 712–713.

J.L. Zyskind, C.R. Giles, J.R. Simpson and D.J. DiGiovanni, "Erbium–Doped Fiber Amplifiers and the Next Generation of Lightwave Systems," AT&T Technical Journal, Jan./Feb. 1992, pp. 53–62.

S.G. Grubb and A.J. Stentz, "Fiber Raman Lasers Emit at Many Wavelenghts," Laser Focus World, Feb. 1996, pp. 127–134.

G.P. Agrawal, "Fiber Nonlinearities," Nonlinear Fiber Optics, Second Edition 1995, pp. 14–21.

R.H. Stolen, "Nonlinear Properties of Optical Fibers," Optical Fiber Telecommunications, 1979, pp. 125–150.

M.N. Islam, "Mach–Zehnder Interferometer Switches," Ultrafast Fiber Switching Devices and Systems, 1992, pp. 38–43.

*Primary Examiner*—Brian Healy
*Attorney, Agent, or Firm*—Harness, Dickey & Pierce, P.L.C.

[57] ABSTRACT

A distributed gain medium, such as an optical fiber, is configured as a Sagnac interferometer or loop mirror, and this mirror is used as at least one of the two reflectors in the amplifier or laser. The distributed gain medium produces optical signal gain through nonlinear polarization, that may cascade through several orders. The Sagnac interferometer or loop mirror defines two optical paths that will support both common mode and difference mode optical signals. Pump fluctuations resulting from higher cascade orders are at least partially rejected through the difference mode signal path, thereby reducing the overall effect of pump fluctuation. The result is a broadband optical resonator, suitable for use at a variety of different wavelengths, including 1.3 μm and 1.55 μm wavelengths. Amplifiers based on this technology are "four-level," providing a pass through signal even when the pump laser is not functioning.

82 Claims, 13 Drawing Sheets

$g_{peak} = \gamma P$
$\Delta \kappa_{peak} = -2\gamma P$
$\Delta \kappa_{max} = -4\gamma P$

SAGNAC RAMAN AMPLIFIERS AND CASCADE LASERS

BACKGROUND AND SUMMARY OF THE INVENTION

The capacity of telecommunication systems has been increasing by an order of magnitude every three to four years since the mid 1970s, when optical fibers were first introduced into these systems. Optical fibers provide a four-order-of-magnitude bandwidth enhancement over twisted-pair copper wire, and over the past 20 years engineers have been mining this bandwidth-rich medium. By about 1986 the theoretical loss limits on optical fibers had been reached, and many wondered whether the capacity increase would begin to saturate by the early 1990s. However, quite to the contrary, with the introduction of erbium-doped fiber amplifiers (EDFAs) around 1990 to replace electronic repeaters, the capacity has grown by almost two orders of magnitude since. Thus every prediction of telecommunication system trends prior to 1990 are incorrect because they did not take into account the paradigm change associated with EDFAs. Also, from a practical standpoint, experience shows that no matter how much bandwidth is made available, people will find innovative ways of using it.

Although EDFAs have had a significant impact in the past five years, they are not without problems. First EDFAs work at an optical wavelength near 1.55 micrometers ($\mu$m), yet most of the terrestrial fibers installed in the United States during the 1970s and up through the mid 1980s are designed for operation at 1.3 $\mu$m. Thus thousands of miles of 1.3 $\mu$m terrestrial fiber have already been laid and this presents major difficulties in upgrading to the higher bandwidth EDFA technology. Some have sought to combine EDFAs with dispersion compensators, in an effort to correct the wavelength mismatch. However this approach does not permit further upgrading based on wavelength-division-multiplexing, and it therefore is not seen as the best solution. Others are experimenting with new glass formulations that might provide the advantages of EDFAs at the shorter 1.3 $\mu$m wavelength. However, currently no glass formulation has proven to be commercially viable.

Aside from the wavelength mismatch, EDFAs are also inherently prone to signal loss when the pump laser fails. EDFAs are systems of the type known as "three level" systems that will not allow the optical signal to pass through unless the pump laser is operative. Reliance on three level systems can have catastrophic consequences for the reliability of fiber networks. To overcome this, much expense is required to provide redundancy. A more reliable system would be a "four-level" system that simply provides no gain when the pump laser is off, but otherwise allows the optical signal to pass through the system.

The present invention is such a four-level system, employing stimulated Raman scattering amplifiers based on fused silica fibers. Unlike current EDFA technology, the present invention works well at 1.3 $\mu$m. Indeed, the present invention employs a broadband technology that will work well over a wide range of different optical wavelengths.

Stimulated Raman scattering amplifiers work on an entirely different principle than EDFAs. Stimulated Raman scattering amplifiers are based on nonlinear polarization of the dielectric silica host, whereas EDFAs are based on the doping of glass fibers with rare earth ions. Signal amplification in Raman amplifiers is due to stimulated scattering accompanied by the excitation of molecules into a vibrational state. In contrast, signal amplification in EDFAs is due to stimulated emission accompanied by relaxation of the excited ions to the ground state. Thus Raman amplifiers and erbium-doped amplifiers work on entirely different physical principles.

The nonlinear polarization in Raman amplifiers is third order in electric field strength, resulting in a nonlinear index of refraction and gain that are both proportional to the instantaneous pump intensity. In contrast, the medium polarization is linear in the EDFA.

From a functional standpoint, stimulated Raman scattering amplifiers can be pumped at any wavelength (i.e., there is no pump absorption band), while the signal gain characteristics are determined by the optical phonon spectra. By comparison, the pump and signal band characteristics (i.e., the spectrum and center wavelength) of EDFAs are fixed by the rare earth atomic resonances. This means that stimulated Raman scattering amplifiers are capable of cascading to higher orders or longer wavelengths, whereas EDFAs present no opportunity to cascade in wavelength.

Cascading is the mechanism by which optical energy at the pump wavelength is transferred, through a series of nonlinear polarizations, to an optical signal at the longer signal wavelength. Each nonlinear polarization of the dielectric produces a molecular vibrational state corresponding to a wavelength that is offset from the wavelength of the light that produced the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders.

The ability to cascade makes stimulated Raman scattering amplifiers very desirable, for it allows operation over a wide range of different wavelengths. There is, however, a significant problem with Raman amplifiers that has not heretofore been overcome. Virtually every light source or pump produces some intensity fluctuation. When Raman amplifiers are allowed to cascade through several orders, the pump source intensity fluctuations are combinatorially multiplied, and very rapidly result in enormous intensity fluctuations that have heretofore made systems virtually unusable. Compounding the problem the gain produced by this nonlinear response in the third order electric field strength is proportional to instantaneous pump intensity. Thus there is no opportunity to "average out" intensity fluctuations over time. Moreover, the gain produced by Raman scattering is, itself, an exponential effect. All of these properties have lead most to conclude that stimulated Raman scattering amplifiers and cascade lasers are not suitable in general purpose telecommunication applications.

The present invention attacks this major problem by recognizing that higher order intensity fluctuations are a distributed effect (everywhere present in the distributed gain medium that produces the optical signal gain) that can be significantly reduced by a reflector structure that rejects intensity fluctuations originating in this distributed effect. The present invention employs a reflector structure that defines two optical paths within the distributed gain medium, configured to support both common mode and difference mode optical signals. By chosing a configuration that propagates higher order intensity fluctuations in the difference mode, much of the unwanted amplification of pump fluctuations is rejected.

Although numerous configurations are possible, one embodiment employs a Sagnac interferometer as one of the two optical resonator reflectors. The Sagnac interferometer employs an optical coupler with both ends of a fiber loop (a distributed gain medium) connected to its light splitting ports. The coupler thus establishes two optical paths, a clockwise path and a counterclockwise path. Signals are compared at this optical coupler, with common mode signals being substantially reflected and difference mode signals being at least partially rejected through a rejection port associated with the optical coupler. Although intensity fluctuations originating at the pump (at the pump wavelength) are amplified, any intensity fluctuations resulting from higher order stimulation of the distributed gain medium are at least partially rejected as difference mode signals.

Unlike EDFAs, the system of the invention provide true four-level amplification, in which the optical signal is not blocked when the pump is off. A telecommunication system based on the present invention would therefore inherently have greater reliability and tolerance to fault.

For a more complete understanding of the invention, its objects and advantages, reference may be had to the following specification and to the accompanying drawings.

DESCRIPTION OF THE PREFERRED EMBODIMENTS

The present invention provides a structure for reducing the inherent noise pumping in cascading optical resonators such as Raman amplifiers and cascade lasers. More specifically, the preferred embodiments combine Sagnac interferometer technology with Raman amplifier technology to achieve performance improvements that neither technology, by itself, has heretofore been able to deliver. To provide a better understanding of the amplification mechanism at work in the present invention, some knowledge of the Raman effect will be helpful. Described below, the stimulated Raman scattering effect is a result of third order nonlinearities that occur when a dielectric material (such as an optical fiber) is exposed to intense light. The third order nonlinear effect is proportional to the instantaneous light intensity. This distinguishes Raman gain and other third order nonlinearities from other distributed gain media, such as erbium-doped media.

STIMULATED RAMAN SCATTERING

Figure 1:
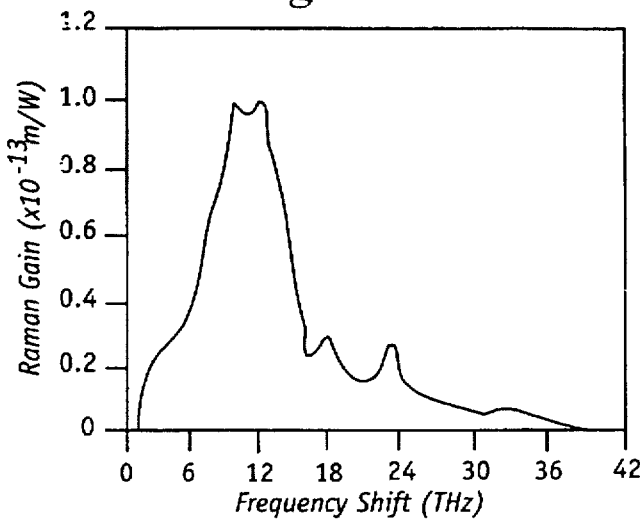
FIG. 1 is a graph depicting Raman gain as a function of frequency shift for fused silica at a pump wavelength of 1 µm.

Stimulated Raman scattering is an important nonlinear process that can turn optical fibers into amplifiers and tunable lasers. Raman gain results from the interaction of intense light with optical phonons in the glass, and the Raman effect leads to a transfer of power from one optical beam (the pump) to another optical beam (the signal). An interesting property of Raman gain, the signal is downshifted in frequency (upshifted in wavelength) by an amount determined by the vibrational modes of the glass. The Raman gain coefficient $g_r$ for silica fibers is shown in FIG. 1. Notably, the gain $g_r$ extends over a large frequency range (up to 40 terahertz [THz]), with a broad peak centered at 13.2 THz (corresponding to a wavelength of 440 cm$^{-1}$). This broad behavior is due to the amorphous nature of the silica glass and means that the Raman effect can be used as broadband amplifiers. The Raman gain depends on the composition of the fiber core and can vary with different dopant concentrations.

The optical resonator of the invention employs a distributed gain medium comprising a material that produces optical signal gain due to third order nonlinearities in the material, in which the gain is proportional to the intensity of the light passing through the medium. By way of background, the response of any dielectric to light becomes nonlinear for intense electromagnetic fields, and optical fibers are no exception. This nonlinear response is related to anharmonic motion of bound electrons under the influence of an applied field. The induced polarization P from the electric dipoles is not linear in the electric field E. Rather, it satisfies the more general relationship described in equation (1)

$$P = \epsilon_0 [X^{(1)} \cdot E + X^{(2)} : EE + X^{(3)} \vdots EEE + \ldots] \qquad (1)$$

where $\epsilon_0$ is the vacuum permitivity and $X^{(j)}$ (j=1,2,...) is the jth order susceptibility. To account for the light polarization effects, $X^{(j)}$ is a tensor of rank j+1. The linear susceptibility $X^{(1)}$ represents the dominant contribution to P. Its effects are included through the refractive index n and the attenuation coefficient α. The second order susceptibility $X^{(2)}$ is responsible for such nonlinear effects as second harmonic generation and sum-frequency generation. However, this second order susceptibility is nonzero only for media that lack an inversion symmetry at the molecular level. Since silicon dioxide is a symmetric molecule, $X^{(2)}$ vanishes for silica glasses. As a result, optical fibers do not normally exhibit second order nonlinear effects. Nevertheless, dopants introduced inside the fiber core can contribute to second harmonic generation under certain conditions.

The third order susceptibility $X^{(3)}$, which is responsible for phenomena such as third harmonic generation, four-wave mixing and nonlinear refraction, are present in optical fibers. It is this third order nonlinearity that is operative in the present invention. These third order nonlinear effects are identifiable as being variable in proportion to the intensity of the light. In contrast, nonlinear effects produced by erbium doping are due to atomic resonance within the material and the effect does not vary in proportion to the instantaneous light intensity but rather with the integral (average) of light intensity with respect to time (energy), over the upper state (stimulated emission) lifetime of the erbium atoms.

To further explore the mechanism at work in stimulated Raman scattering amplifiers and cascade lasers, a comparison with erbium-doped fiber amplifiers (EDFAs) is provided in the following section.

Raman Amplifiers and Erbium-Doped Fiber Amplifiers Compared

To provide a further understanding of Raman amplification, Table I compares stimulated Raman scattering amplifiers (SRS) with erbium-doped fiber amplifiers (EDFA).

TABLE I

| EDFAs | SRS |
| --- | --- |
| based on principle of doping glass fibers with rare earth ions | based on nonlinear polarization of the dielectric silica host |
| glass is a passive host and the medium polarization responsible for the field interaction is generated by the doping ions; the medium polarization is linear | nonlinear response is third order in electric field strength; consequently the nonlinear index of refraction and gain are proportional to the pump intensity |
| signal amplification is due to stimulated emission accompanied by relaxation of the excited ions to the ground state | signal amplification is due to stimulated scattering accompanied by the excitation of molecules into a vibrational state |
| pump and signal band characteristics (i.e., spectrum and center wavelength) are fixed by the rare earth atomic resonances, no opportunity to cascade | pump can be at any wavelength (i.e. there is no pump absorption band), while the signal gain characteristics are determined by the optical phonon spectra, implies ability to cascade |
| gain spectrum characteristics can be modified by glass codopants: glass host affects the Stark level positions, transition homogeneous and inhomogeneous line widths, nonradiative decay characteristics | gain spectrum characteristics can be modified by glass codopants: glass host determines the phonon spectrum distribution and Stokes shift (shift between pump and signal) |
| pumping can be either co- or counter-propagating with respect to the signal | pumping can be either co- or counter-propagating with respect to the signal |
| three level system so absorbs signal when pump absent | four level-like system to signal transmits without amplification when pump absent |
| fiber lengths can be relatively short (several meters) | typical require relatively long fiber lengths (a kilometer or more) |
| intrinsically polarization insensitive | although intrinsically polarization sensitive, polarization scrambling |

TABLE I-continued

| EDFAs | SRS |
| --- | --- |
| | in long lengths of fiber creates an effective polarization insensitivity |

As the above Table I suggests, Raman amplification has a number of attractive features. First, Raman gain exists in every fiber; hence Raman gain is a good candidate for upgrading existing fiber optic links. Second, unlike EDFAs, there is no excessive loss in the absence of pump power, an important consideration for system reliability. Third, the gain spectrum is very broad (bandwidth of greater than 5 THz around the peak at 13.2 THz), so that it can be used to amplify multiple wavelengths (as in wavelength division multiplexing) or short optical pulses. Also, Raman amplification can be used for distributed amplification, which may be especially valuable for ultrahigh-bit-rate systems. Finally, by varying the pump wavelength or by using cascaded orders of Raman gain, the gain can be provided over the entire telecommunications window between 1.3 μm and 1.6 μm, for example. In contrast, EDFAs only operate near the 1.55 μm window.

Despite the advantages, Raman amplifiers also have a number of difficulties that need to be considered before applying the technology in systems. First, a major drawback is that typically high pump powers are required (typically peak powers on the order of 1 watt). The need for high pump power can be satisfied by using a combination of high power semiconductor laser diodes or cladding-pumped fiber lasers, together with fibers that have increased Raman gain cross-section and smaller core affective area. For example, recently Raman amplifiers with gain coefficients of 0.1 dB/mW have been demonstrated, and further improvements could increase this efficiency to 0.15 dB/mW, or higher. In this regard, see E. M. Dianov, A. A. Abramov, M. M. Bubnov, A. V. Shipulin, A. M. Prokhorov, S. L. Semjonov, A. G. Schebunjaev, G. G. Deviatykh, A. N. Guryanov and V. F. Khopin, Opt. Fiber Tech. 1, 236 (1995).

In comparison, EDFAs pumped at 1480 nm have a gain coefficient of about 6 dB/mW and EDFAs pumped at 980 nm have a gain coefficient of around 10 dB/mW in optimized configurations.

Aside from the high power requirements, Raman amplifiers have been known to cause interchannel interference in multiple wavelength systems. In particular, as different wavelengths pass through each other, the shorter wavelength signal tends to transfer energy to the longer wavelength signal.

As a consequence, the gain levels end up being different for different wavelength signals. However, since the pulse trains walk through each other, due to group velocity dispersion, the interchannel interference effect tends to wash out.

Third, in comparison with other fiber amplifiers like EDFAs, Raman amplifiers require longer fiber lengths (typically on the order of a kilometer or more). Whereas this may not be a difficulty in long haul networks, it prevents their usage in latency-sensitive applications.

In addition to the above difficulties, particular attention must also be given to the handling of spurious signals and noise. A major source of noise in Raman amplifiers arises from the coupling of intensity fluctuations in the pump laser to the signal. This problem is absent in EDFAs, because of the very long upper state lifetime that is characteristic of EDFAs. However, the coupling of intensity fluctuations in the Raman amplifier can be significantly reduced by arranging the pump and signal so that they are counterpropagating through the amplifier. When this is done the pump fluctuations are averaged and the crosstalk between pump and signal is significantly reduced. A second source of noise in the Raman amplifier is double-Rayleigh scattering within the amplifier itself. This can be partially compensated by placing an interstage isolator within the amplifier for the signal to reduce the multiple path interference.

Examples of Several Preferred Configurations

Figure 2:
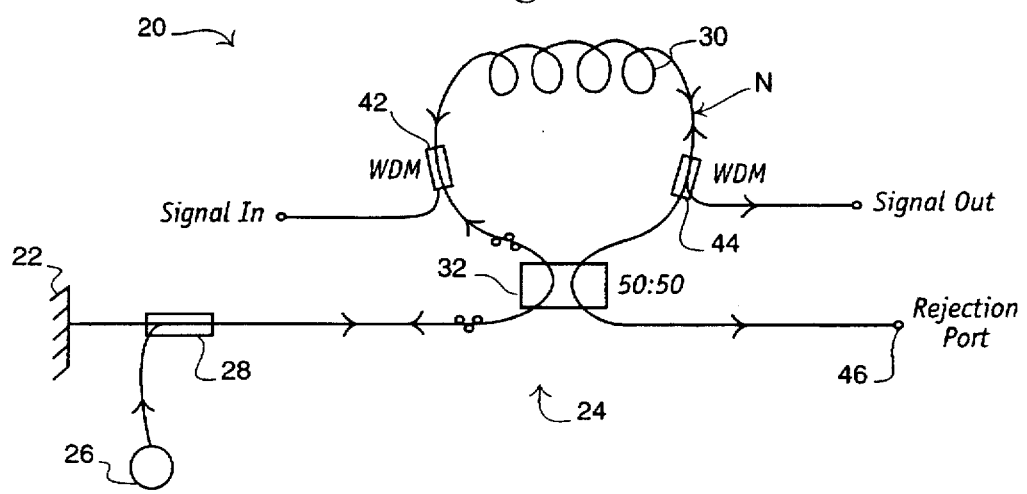
FIG. 2 is a diagrammatic illustration of one configuration for the optical resonator in accordance with the present invention.

Referring to FIG. 2, a first embodiment of the optical resonator has been illustrated at 20 the optical resonator employs at least two reflectors and a port for coupling to a source of light. Specifically, reflector 22 may be any reflective structure such as a mirror. Reflector 24 is a loop reflector such as a Sagnac interferometer. A further explanation of the loop reflector 24 will be presented below. In the illustrated embodiment the light source 26 is a pumped fiber laser coupled through WDM port 28 to the optical resonator. The illustrated embodiment is fabricated using optical fiber (e.g. fiber optic cable).

The Sagnac interferometer that serves as reflector 24 is fabricated from a length of optical fiber that may be suitably coiled to accommodate the physical packaging requirements. The Sagnac interferometer comprises a fiber loop 30, typically a kilometer or more in length. The fiber loop is established using a coupler such as 50:50 coupler 32. The 50:50 coupler defines two signal paths, such that half of the light from light source 26 travels around loop 30 in a clockwise direction and half of the light from light source 26 travels around loop 30 in a counterclockwise direction.

Figure 3:
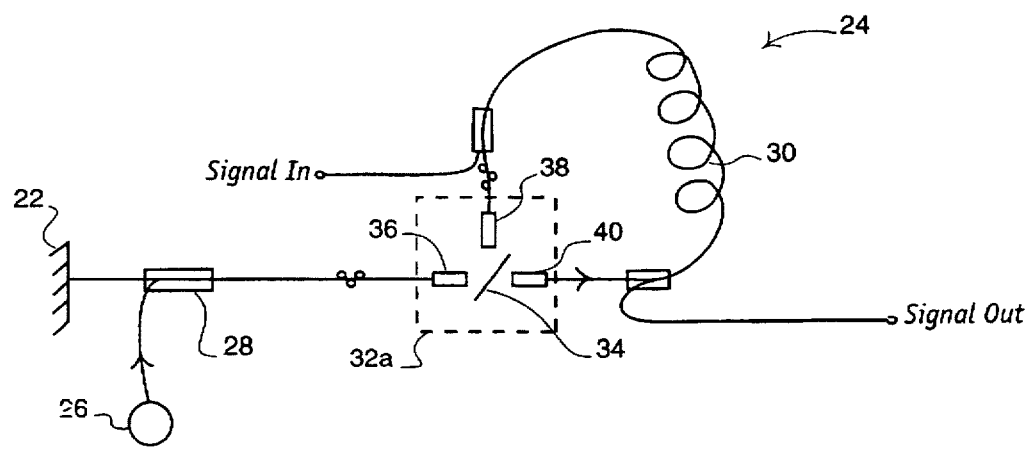
FIG. 3 is a diagram of another embodiment of the optical resonator of the invention, useful in further understanding the counter-propagating optical paths.

To illustrate the concept behind the 50:50 coupler 32, refer to FIG. 3. FIG. 3 illustrates an alternate embodiment of the invention in which the coupler 32a is shown using discrete bulk components. Coupler 32a uses a half-silvered mirror 34 positioned midway between a trio of grin lenses 36, 38 and 40. Light emitted from pump 26 and injected through WDM coupler 28 emits through lens 36. Depending on the opacity of the mirror 34, a portion of the light is reflected into lens 38 and a portion is passed through mirror 34 into lens 40. This splitting causes a portion of the light to travel clockwise through fiber loop 30 and a portion of the light to travel counterclockwise through loop 30. A comparable result is achieved by the 50:50 coupler 32 shown in the embodiment of FIG. 2.

The optical resonator of the invention can function as a laser, and also as an optical amplifier. When configured as a laser the optical resonator requires no signal input (other than the light supplied by pump light source 26). The reflectors 22 and 24 establish a resonant cavity, producing the laser effect. When configured as an optical amplifier, an optical signal is injected into the optical resonator and this signal is then amplified by the optical energy introduced by the light source 26. In the embodiment of FIG. 2, an optional signal input WDM port 42 is provided to allow the optical resonator to be used as an optical amplifier. If the optical resonator is being configured as a simple laser, the signal input WDM port can be omitted. A similar signal output WDM port 44 supplies the output of the laser or optical amplifier. If desired, a rejection port 46 can also be provided, as an output of the 50:50 coupler 32.

Noise Rejection

The Sagnac interferometer defines two optical paths (one clockwise and the other counterclockwise). These two optical paths support both common mode and difference mode optical signals. To illustrate, assume that a continuous wave burst of light is injected in WDM 28 via light source 26. The CW burst enters the Sagnac reflector 24; half of the energy propagates in a clockwise direction and half of the energy propagates in a counterclockwise direction. After propagating through the Sagnac reflector, the continuous wave burst is then reflected back in the direction of WDM 28, where the burst then reflects from reflector 22 and is again transmitted to the Sagnac reflector, where the cycle repeats. The CW burst thus resonates between the two reflectors 22 and 24, growing in energy at the resonant frequency. This is the common mode signal path. The system is designed to reflect the common mode signal between reflectors 22 and 24, whereby the laser effect or optical amplification occurs.

Now consider a noise burst signal that originates at some random location along fiber loop 30. For purposes of the illustration, assume that the noise burst is injected at a location designated by N in FIG. 2. Some of the energy of the noise burst (that which propagates in the clockwise direction) passes out through rejection port 46 where it is not returned to the system. The remainder (propagating in the counterclockwise direction) is reflected within the system and therefore retained. Because the signal paths of the noise burst are unbalanced (difference mode), a portion of the noise burst energy (approximately half of the energy) is lost, thus lowering the noise level within the system. The noise burst originating in the fiber loop travels in a difference mode, in which one optical path is retained within the system and the other optical path is discharged through rejection port 46. This is how the invention is able to reduce higher order amplification of pump source fluctuation. The higher orders originate (through the Raman effect) within the fiber loop and are thus treated as difference mode signals. The following section explains this further.

Rejection of Higher Order Fluctuations As previously noted, the Raman amplifier is capable of cascading through multiple orders. With each cascade order there is a corresponding shift in optical wavelength. The wavelength shift corresponds to a predetermined Stokes wavelength. Thus to achieve a 1310 nm signal wavelength four cascaded orders of Stokes shift would be employed, namely: 1117 nm to 1175 nm to 1240 nm to 1310 nm. Similarly, a fifth Stokes shift, based on the previous cascaded orders, would produce an output wavelength at 1480 nm.

Cascading is a desirable property; it allows the system designer to shift the pump wavelength to any number of different desired signal wavelengths. Thus commercially available, high-powered pumps can be wavelength shifted to match the wavelength of the signal being amplified. However, cascading comes at a price. Pump fluctuations are amplified combinatorially, as Table II demonstrates. Table II shows how a 10% intensity fluctuation at the pump cascades exponentially with each cascaded order. Table II compares two cases. Case 1 assumes a 10% fluctuation introduced in the first step, using a simple Fabry-Perot (linear) cavity so that there is no rejection of the fluctuation burst. Case 2 assumes a 10% fluctuation introduced in the second step, using a Sagnac Raman laser cavity with a 50% rejection of the fluctuation burst. Thus Case 2 shows the improvement achieved using the principles of the invention.

TABLE II

|  | Case 1 Fluctuation | Case 2 Fluctuation |
| --- | --- | --- |
| Initial Fluctuation | 10% | 10% |
| First Reflection | 10% | 5% |

TABLE II-continued

|  | Case 1 Fluctuation | Case 2 Fluctuation |
| --- | --- | --- |
| from Sagnac Mirror |  |  |
| After First Stage (10 × Gain) | 26% | 12% |
| After Second Stage (5 × Gain) | 52% | 22% |
| After Third Stage (2.5 × Gain) | 61% | 22% |

In the specific example illustrated in Table II we are considering only one noise burst, entered in the first step. The fluctuation is reduced to ⅓ by using the invention. Compare the 61% fluctuation in Case 1 with the 22% in Case 2. The values in Table II are based on the following model.

Assume that the systems compared in both cases start with a pump and then cascade three orders (e.g., 1117 nm pump, cascade to 1175 nm, 1240 nm and then 1310 nm). We can specify the gain at each successive order to be ½ of the previous order. A gain in the first step of 10 dB=10 x has been assumed. In this model the gain in the earlier stages is higher than in the later stages, because the earlier stages are robbed of power by the later stages during the cascading process. In general, the gain required at each stage for lasing is going to be such that the gain balances the loss. Thus, pumping higher orders corresponds to a loss and earlier stages must therefore have more gain. For simplicity, pump depletion and the resulting gain saturation have been neglected. Case 1 illustrates how a 10% noise fluctuation grows to a 61% fluctuation after three stages. Case 2 shows how that same noise fluctuation is amplified only 22% due to the 50% rejection in the Sagnac mirror for the higher stages. In Table II, note that the initial 10% fluctuation is reduced to 5% upon first reflection from the Sagnac mirror. This corresponds to 50% of the difference mode energy being rejected through the rejection port.

Figure 16A:
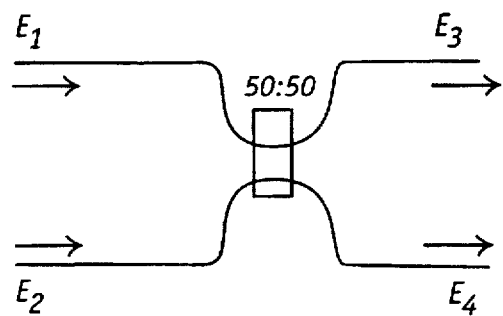
FIG. 16A–16B are illustrations that accompany the equations used to generate values for Table II presented below.

The equations used to generate the values shown in Table II will now be described with reference to FIG. 16A and 16B. In FIG. 16A two optical signal paths are shown being fed into and out from a 50:50 coupler. The input signals $E_1$ and $E_2$ produce output signals $E_3$ and $E_4$, respectively according to the following equations:

$$E_3 = \frac{1}{\sqrt{2}} E_1 + j\frac{1}{\sqrt{2}} E_2$$

$$E_4 = j\frac{1}{\sqrt{2}} E_1 + \frac{1}{\sqrt{2}} E_2$$

In the above equations $j=\sqrt{-1}$, corresponding to the phase of II/2. Propagation through a fiber of length L is given by the following equation: $E_i e^{j\phi}$, in which $\phi$ corresponds to the following phase shift calculation:

$$\phi = \frac{2\pi}{\lambda} \cdot n \cdot L.$$

Figure 16B:
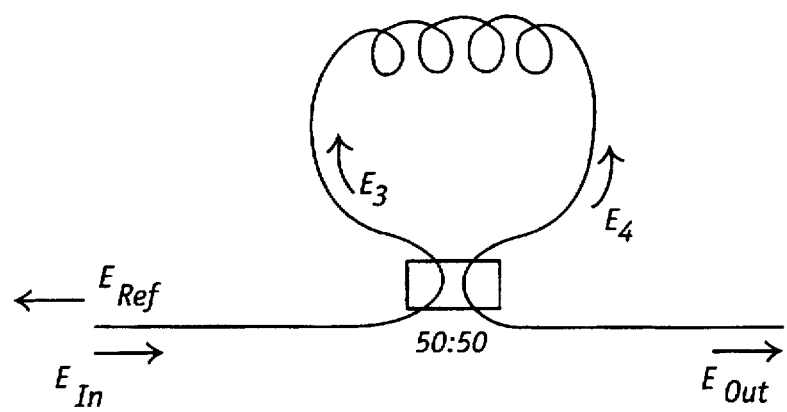

FIG. 16b shows the signal propagation within a Sagnac loop mirror that comprises a 50:50 coupler. The input electric field $E_{in}$ is split at the coupler, propagating in clockwise and counterclockwise directions, corresponding to electric fields $E_3$ and $E_4$. These fields are related to the input field $E_{in}$ according to the following equations:

$$E_3 = \frac{1}{\sqrt{2}} \cdot E_{in}$$

$$E_4 = j\frac{1}{\sqrt{2}} \cdot E_{in}$$

The effect of the Sagnac loop mirror is to produce a reflected field $E_{ref}$ that corresponds to the common mode of propagation, and to produce a rejected field $E_{out}$ that corresponds to the difference mode of propagation. The common mode and difference mode signals are thus described by the following equations:

$$E_{ref} = \frac{1}{2} j\{E_{clockwise} + E_{counterclockwise}\} \rightarrow \text{common mode reflection}$$

$$E_{out} = \frac{1}{2} \{E_{clockwise} - E_{counterclockwise}\} \rightarrow \text{difference mode rejection}$$

As the above Table shows, even a modest pump fluctuation (in this example a 10% fluctuation) is multiplied again and again through each cascaded order. This is why Raman amplifiers have not been considered generally useful in the past. However, the invention overcomes this problem by adopting a structure that places the distributed gain medium in a difference mode signal path, such that higher order pump fluctuations are at least partially rejected.

In each of the embodiments illustrated above, and also in the embodiments described below, light source 26 can be any suitable source of optical energy. Because the Raman effect relies upon intense optical energy, high power semiconductor or cladding-pumped fiber lasers are presently preferred. A suitable high power source is available from Spectra Diode Lasers, Inc., San Jose, Calif. The wavelength of the optical energy from light source 26 will, of course, be chosen to match the desired application. By way of example, in an embodiment designed for 1.3 µm telecommunication applications, the light source 26 provides light at a wavelength of 1117 nm. This light is introduced through the wavelength division multiplexing (WDM) coupler 28. The optical signal to be amplified, injected through WDM coupler 42, may be at a wavelength of 1300 nm to 1310 nm. The injected signal propagates in the clockwise direction around loop 30 and is then removed using WDM coupler 44. Due to the frequency downshift (wavelength upshift) of the Raman effect, the wavelength of the light source 26 is upshifted to match that of the signal. Although a 1.3 µm amplifier example is presented here, the configuration illustrated in FIG. 2 and the embodiments described elsewhere in this specification can be configured to work at other wavelengths as well. Thus the light source 26 can be any suitable wavelength to match the application (not necessarily at 1117 nm) and the two WDM couplers 42 and 44 can be designed for any desired signal wavelengths (not necessarily between 1300 nm and 1310 nm).

The resonant cavity of the embodiment illustrated in FIG. 2 (and also illustrated in FIG. 3) lies between reflector 22 and reflector 24. In the illustrated embodiment the optical fiber disposed between these two reflectors serves as the light transmissive medium. The Sagnac reflector 24 is fabricated using a distributed gain medium comprising a material that produces optical signal gain through third order nonlinearities in the material, characterized by a gain that is proportional to the intensity of the light passing through the medium. Although reflector 22 is shown as a discrete mirror in the embodiments illustrated so far, it will be appreciated that reflector 22 could be any form of reflector, including a simple metallic coating evaporated onto the fiber end. Thus the invention can be implemented as an all fiber configuration. Some of the embodiments yet to be described use other forms of reflectors for reflector 22.

One advantage of using the Sagnac reflector 24 is its inherent broadband properties. Unlike some other systems that are restricted by the laws of physics to operate at a single resonant frequency dictated by doping, the present invention operates over a broad range of frequencies, the operating frequency being dependent principally upon the frequency of the input signal. Of course, if desired, frequency-selective gratings or frequency-selective filters can be employed within the laser cavity if precise wavelength control is desired.

One significant advantage of the invention results from the union of the Sagnac loop mirror with the Raman amplifier technology. Conventionally, a large source of amplitude jitter in Raman lasers arises from the pump fluctuations that become greatly amplified in the highly nonlinear cascaded Raman process. Advantageously, the Sagnac loop mirror results in a quieter amplifier (and also a quieter laser) due to its difference mode noise rejection properties. The Sagnac loop tends to dampen noise at frequencies larger than the inverse round-trip time of the loop cavity. For example, for a 2 kilometer (km) long fiber loop, noise at frequencies larger than 100 kilohertz (kHz) will be partially rejected via the rejection port 46. Also, as previously pointed out, spurious signals and noise injected at some arbitrary point along the loop are also attenuated.

Figure 4:
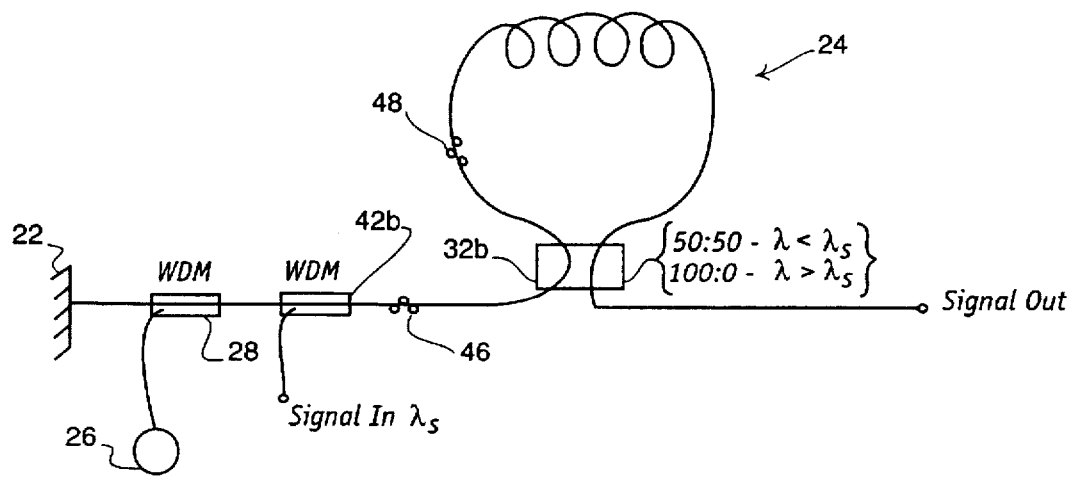
FIG. 4 is yet another embodiment of the optical resonator of the invention employing dichroic couplers for wavelength discrimination.

In the embodiments described above a 50:50 coupler 32 (and 32a) was selected, as it provides the most general purpose example of the principles of the invention. Depending on component availability or special requirements for a particular application, different embodiments of the optical resonator may be used. Referring to FIG. 4, a dichroic coupler 32b has been used to provide frequency selectivity. In the embodiment of FIG. 4 the dichroic coupler provides nominally 50:50 coupling over the cascade Raman order wavelengths, but a ratio that is closer to 100:0 for the signal wavelength. Thus, for a 1.3 μm system the 50:50 coupling would be provided for wavelengths less than 1300 nm and the 100:0 coupling would be provided for wavelengths greater than 1300 nm. The advantage of this configuration is that it is easier to make a balanced Sagnac interferometer, and the fiber in the Sagnac interferometer may be packaged more simply. One possible disadvantage of this configuration is that the dichroic coupler may be more difficult or expensive to implement.

The embodiment of FIG. 4 also illustrates that the signal can also be input directly into the laser cavity at a location between the two reflectors 22 and 24. Specifically, the signal input WDM port 42b is positioned in the cavity adjacent WDM coupler 28. Also illustrated in FIG. 4 are the use of polarization controllers 46 and 48. Polarization controllers may also be used in a similar fashion in the embodiments illustrated in FIGS. 2 and 3.

Figure 5:
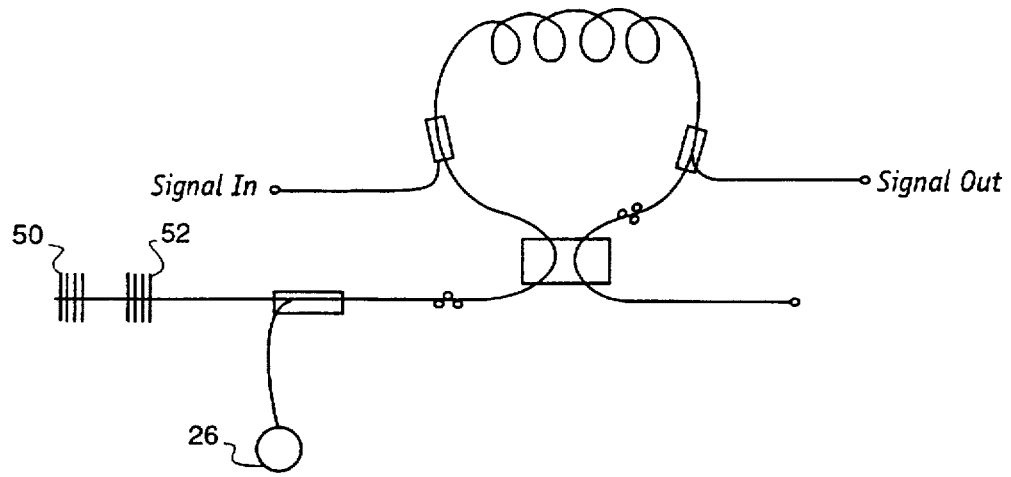
FIG. 5 is another embodiment of the optical resonator employing one or more grating reflectors in addition to the Sagnac interferometer or loop reflector.

FIG. 5 illustrates another embodiment in which the reflector 22 has been replaced by a series of grating reflectors 50 and 52. The grating filters may be selected to provide 100 percent reflection at selected wavelengths, such as at 1175 nm and 1240 nm. The advantage of the configuration of FIG. 5 is that a narrow pump line width can be achieved. The disadvantage is that the configuration is more complicated and more expensive to fabricate.

Figure 6:
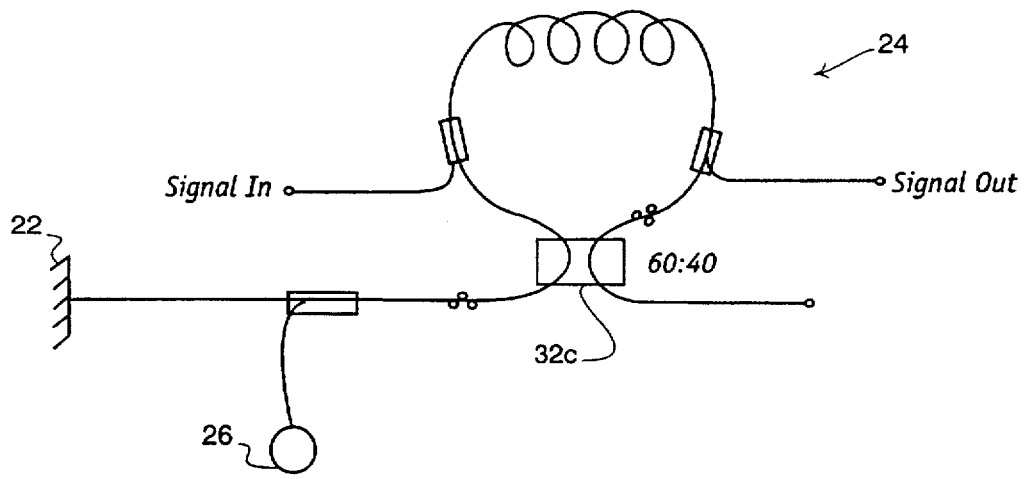
FIG. 6 illustrates yet another embodiment, employing an uneven coupler.

FIG. 6 illustrates yet another embodiment in which the Sagnac reflector 24 is constructed using a coupler 32c having an unequal coupling ration, for instance 60:40. By unbalancing the Sagnac reflector the system will tend to further reject noise bursts that randomly occur in the loop. This will serve to dampen out any mode locking or Q-switching tendencies. However, the unequal coupling leads to a leakage at various wavelengths, so that higher pump powers may be required to account for the reduced efficiency.

Figure 7A:
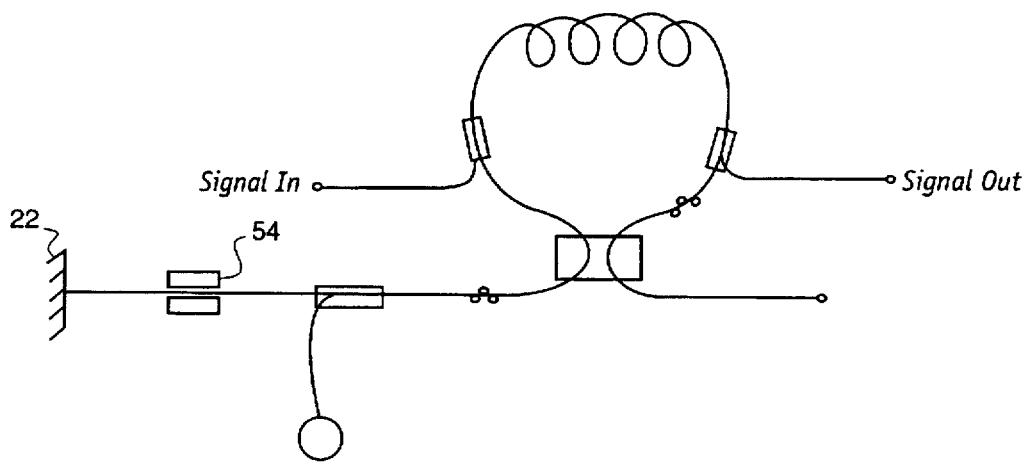
FIG. 7A illustrates another embodiment that includes a Fabry-Perot filter.
Figure 7B:
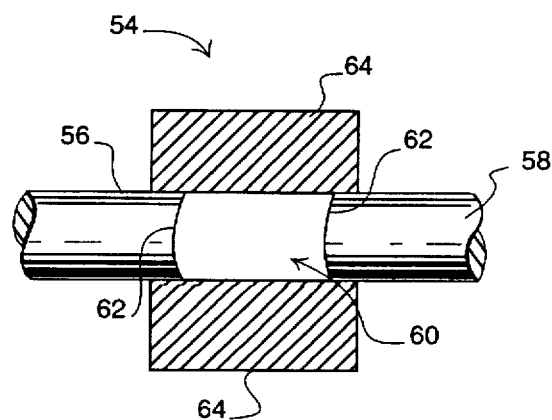
FIG. 7B depicts in detail the Fabry-Perot filter employed in the embodiment of FIG. 7A.

FIG. 7A depicts a hybrid configuration employing a Fabry-Perot wavelength filter 54 to narrowly select the Raman pump orders. A detailed depiction of the Fabry-Perot filter is shown in FIG. 7B. The fiber is split into two segments 56 and 58 and separated to define an air gap 60. The cleaved ends of the fiber segments are coated as at 62 with a nominally high selectivity coating (R>90%) at the wavelengths of interest. The cleaved faces are aligned parallel to each other and piezoelectric transducers 64 may be used to adjust the air gap width. Ideally, the air gap width L can be adjusted so the free-spectral range of the Fabry-Perot interferometer ($\Delta f = c/2nL$) will match the reflection at the various Raman orders (spaced by $\Delta f = 13.2 THz$). Thus a single Fabry-Perot interferometer can be used to replace the multiple gratings 50 and 52 of the FIG. 5 embodiment, because the transmission function is a periodic function of frequency. For example, for an air gap index n=1, the spacing should be 11.36 μm for $\Delta f = 13.2 THz$. Alternatively, the spacing may be some integer multiple of this fundamental width. The fiber Fabry-Perot interferometer can also be replaced with a bulk interference filter, which can be rotated to adjust the peak transmission frequencies.

Sagnac Raman Cascade Lasers

Figure 8:
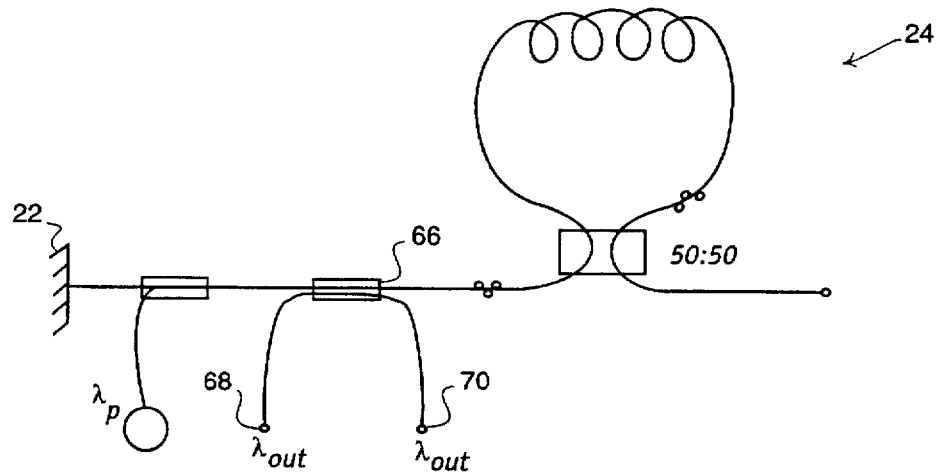
FIG. 8 illustrates a generalized Sagnac Raman cascade laser, providing bidirectional output with a single coupler.

The embodiments illustrated so far have been primarily illustrating how the optical resonator of the invention can be used as an optical amplifier. Thus in the preceding examples, a signal input port is provided into which the signal to be amplified is injected. The invention is not limited to amplifiers, however. As will be illustrated below, the invention can also be used to develop cascade oscillators or cascade lasers. These may be used in a number of different applications, including upgrading existing fiber links. In particular, the following will describe various configurations for constructing Sagnac Raman cascade lasers. FIG. 8 illustrates how a bidirectional output can be achieved with a single coupler. FIG. 8 is configured as a Sagnac interferometer-based cascade Raman laser that provides bidirectional outputs labeled $\lambda_{out}$. An intracavity coupler 66 provides these outputs. Note that unlike the previously described Raman amplifiers, the configuration of FIG. 8 is an oscillator and does not require a signal input. The output at the left (at port 68) should be stronger than the output at the right (port 70) so the right output may be used for monitoring purposes.

Figure 9:
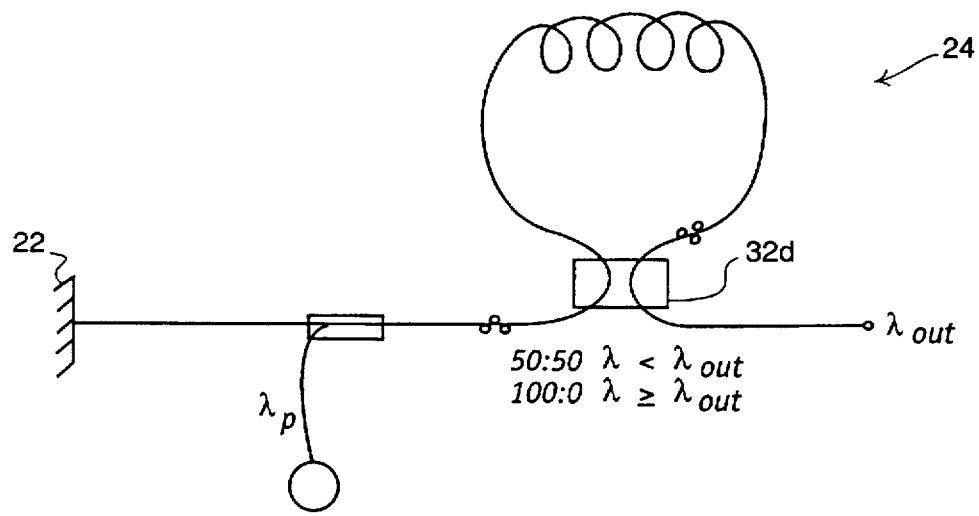
FIG. 9 illustrates another Sagnac Raman cascade laser employing a dichroic coupler.

A dichroic coupler 32d is used in the embodiment of FIG. 9 to implement the Sagnac reflector. The output of this oscillator $\lambda_{out}$ exits from the external cavity port of the Sagnac loop mirror 24. The dichroic coupler can be selected to provide 50:50 coupling over the cascade order and 100:0 coupling at the $\lambda_{out}$ wavelength.

Figure 10:
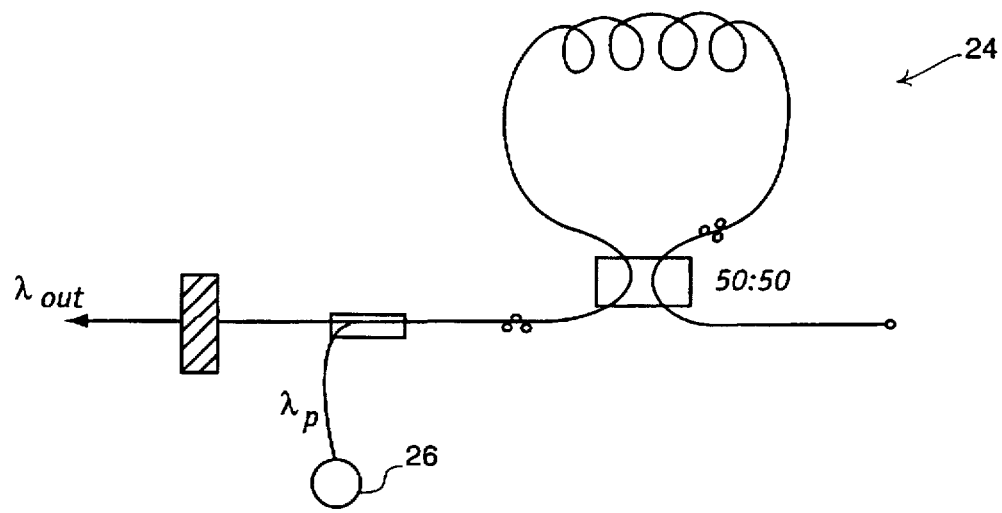
FIG. 10 illustrates a Sagnac Raman cascade laser employing a dichroic mirror at the cavity end.

A further embodiment of Sagnac interferometer-based cascade Raman laser is shown in FIG. 10. In this embodiment a dichroic mirror 72 is used at the cavity end. Note that the dichroic mirror is reflective for cascade order wavelengths and is partially or completely transmitting for the $\lambda_{out}$ wavelength.

The Sagnac interferometer-based cascade Raman lasers described in the preceding examples (FIGS. 8, 9 and 10) may be used in numerous applications, including upgrading existing fiber links, remote pumping of EDFAs, or other applications requiring different wavelengths of light. In this regard, the embodiments illustrated in FIGS. 8–10 are merely exemplary, and there may be other possible configurations employing the principles of the invention.

By way of further illustration, FIGS. 11A–11D show how to apply the technology of the present invention to different situations.

Figure 11A:
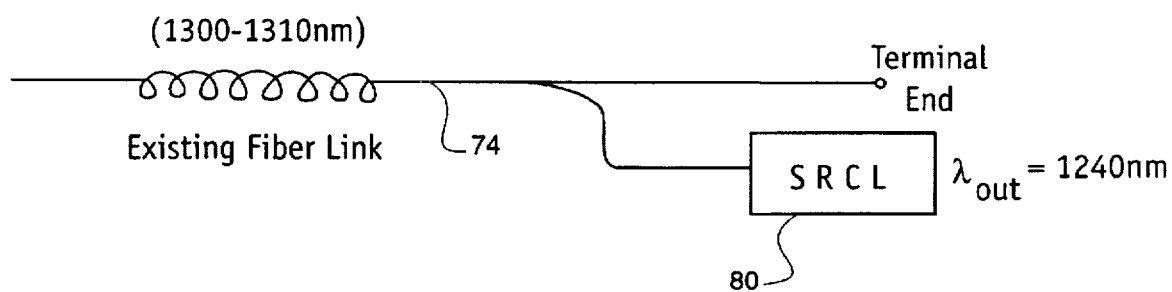
FIGS. 11A–11D illustrate possible configurations for future systems employing the optical resonator system of the invention.

FIG. 11A illustrates how an existing fiber link can be upgraded using the Sagnac interferometer-based cascade Raman laser of the invention. In FIGS. 11A–11D the optical resonator of the invention is designated by the abbreviation SRCL and given reference numeral 80 in the drawings. In FIG. 11A the optical resonator 80 is attached to the terminal end of an existing fiber link 74. In this application the SRCL 80 should operate at 1240 nm. A counter-propagating configuration is shown. This configuration is preferred as it minimizes pump fluctuation coupling.

Figure 11B:
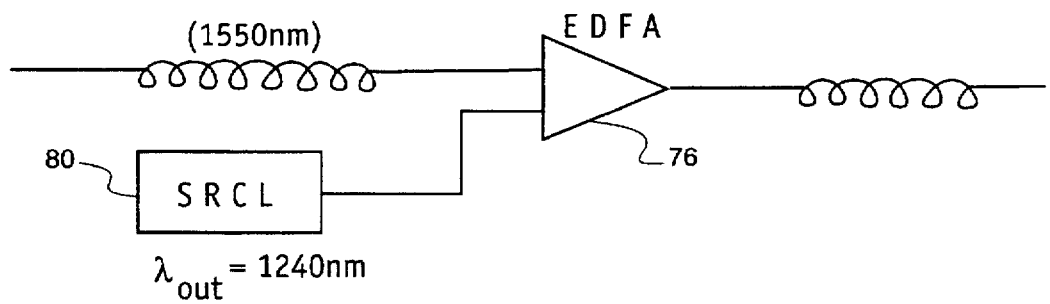

FIG. 11B illustrates how the optical resonator 80 may be used for remote pumping of an EDFA amplifier. The EDFA amplifier is illustrated at 76. In this case the wavelength output of optical resonator 80 provides light at 1480 nm. The SRCL 80 may be adjusted for 1480 nm operation by using five cascade orders from and 1117 nm pump, or six cascade orders from a 1060 nm pump.

Figure 11C:
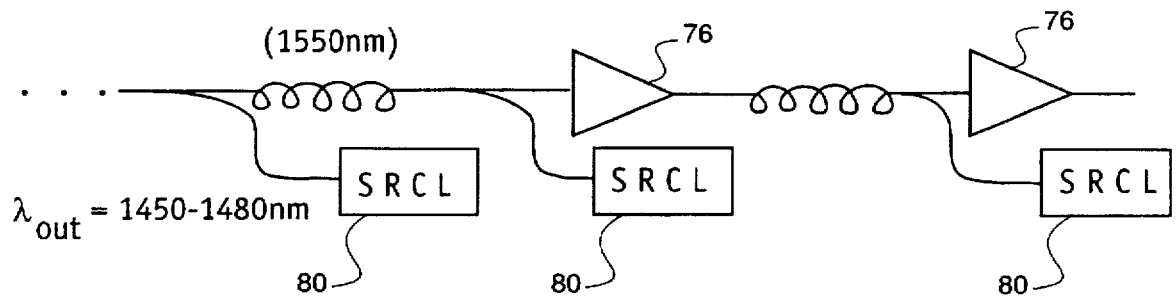

FIG. 11C depicts how to upgrade a 1530–1550 nm transmission line with higher gain or distributed amplification using SRCLs operating between 1450 nm to 1480 nm. In the illustrated system EDFAs 76 are also used. The wavelength out of the SRCL optical resonator 80 may be on the order 1450 nm to 1480 nm.

Figure 11D:
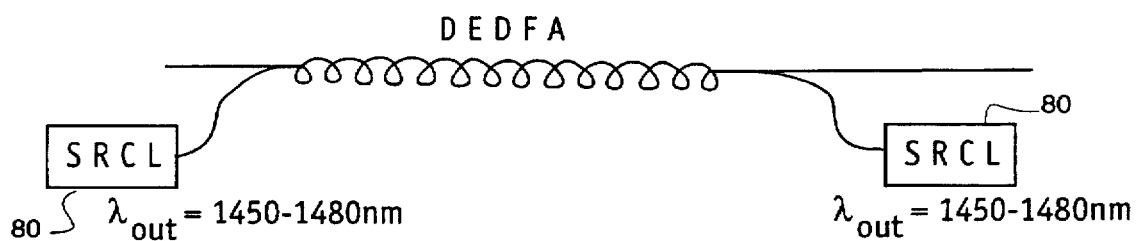

FIG. 11D illustrates a distributed amplification system that employs a distributed erbium-doped fiber amplifier (DEDFA). This erbium-doped fiber amplifier is described by M. N. Islam and L. Rahman, *IEEE Journal, Lightwave Technology* 12, 1952 (1994). This configuration may be appropriate for very high bit rate systems employing soliton shepherding, as described below.

Distributed Amplification for High Bit Rate Systems

Future fiber optic networks will be operating in the 1530–1550 nm wavelength range with bit rates approaching 100 Gb/s or more. With higher bit rates, higher powers are required. Therefore as the bit rate is increased, the amplification level and pump power must increase. In addition, for high speed, time division multiplexed (TDM) systems, short pulse propagation may require pulse control or soliton control mechanisms that are distributed throughout the fiber. A combination of EDFAs and distributed Raman amplification, such as those illustrated in FIG. 11C or 11D may provide the appropriate transmission line for 40 Gb/s and beyond. In particular, the discrete (FIG. 1C) or distributed (FIG. 11D) EDFAs can provide the basic gain at some signal power level with high efficiency. Then Raman amplification can provide the necessary boost in power needed for the high bit rate systems. Moreover, for WDM applications it may be possible to use a combination of EDFA and Raman amplification to broaden or flatten the gain spectrum.

For 100 Gb/s TDM systems using picosecond pulses, several problems need to be addressed in fiber transmission lines longer than several kilometers beyond the usual considerations of loss, dispersion and nonlinear index of refraction. First, "gentler" or more gradual changes in gain and amplitude are necessary to avoid generation of unwanted dispersive waves. For example, discrete EDFAs spaced by more than 25 km may be inappropriate. Second, the length bit rate product is limited by spontaneous emission noise that always accompanies coherent amplification. J. P. Gordon and H. A. Haus, Opt. Lett. 11, 665 (1986) have studied this effect and they show that the most deleterious problem is a random shift in the soliton's carrier frequency with a corresponding change in its velocity. Third, soliton self-frequency shift (SSFS) causes a continuous downshift in the mean frequency of pulses propagating in optical fibers. J. P. Gordon, Opt. Lett. 11, 662 (1986) has shown that for solitons the shift is a strong function of pulse width p ($\lambda \gamma \alpha \tau^{-4}$). SSFS must be avoided for two reasons: 1) the frequency shift changes the timing of pulses in the system; and 2) SSFS couples amplitude fluctuations to frequency and timing fluctuations.

These deleterious effects for ultra-high bit rate systems can be controlled by employing both distributed amplification as well as some sort of distributed filtering for pulse or soliton control. In fact, K. J. Blow, N. J. Doran and D. Wood, "Suppression of the Soliton Self-Frequency Shift by Bandwidth-Limited Amplification," *Journal of Optical Society of America B.*, Volume 5, pp. 1301–1304 (1988) have shown theoretically that the bandwidth limited gain provided by Raman amplification can serve as a distributed frequency filter to counteract SSFS. Likewise, this filtering will also reduce the effect of Gordon-Haus jitter. Therefore, the configurations illustrated in FIGS. 11A and 11D, even perhaps FIG. 1C, can be particularly advantageous for 40 Gb/s and beyond TDM systems. Here we use not only the gain provided by Raman amplification but also the distributed bandwidth limiting that Raman amplifiers can provide.

Modulational Instability Amplifiers Pumped by Sagnac Raman Lasers

Figure 12A:
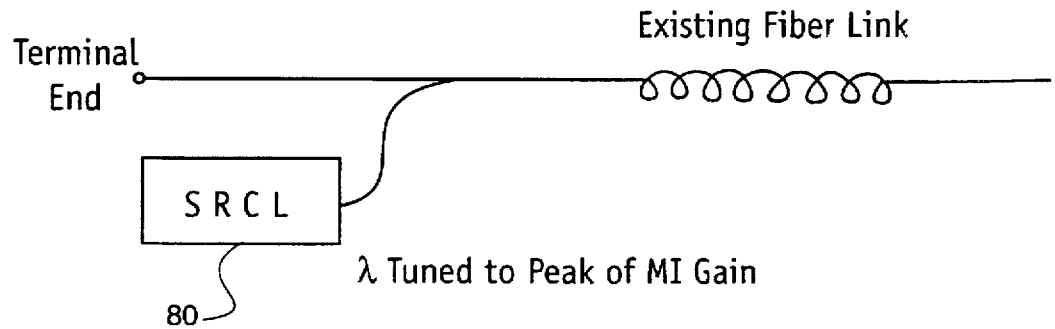
FIGS. 12A–12B illustrate further configurations employing modulation instability (MI) amplification.
Figure 13A:
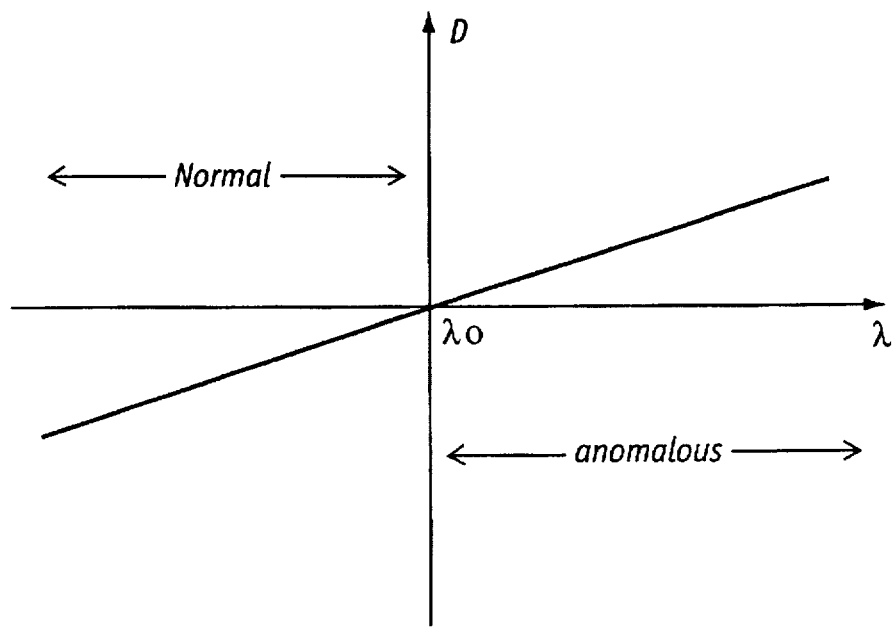
FIGS. 13A–13C are graphs useful in understanding the operation of the MI amplification embodiments.

Although Raman amplification such as in the configuration of FIG. 11A may be used to upgrade existing fiber links, another more efficient method may be to use modulational instability (MI) amplification. For example, the copropagating setup of FIG. 12A may be employed for MI in an existing fiber link, where in particular the SRCL frequency is adjusted to the peak of the MI gain as described below. This frequency separation between pump and signal is generally much smaller than the frequency separation used in Raman amplification and the frequency difference also depends on the pump intensity. Just like in Raman amplification, the main advantage of MI gain is that it is inherent to the glass fiber so it is present in every fiber. MI is 4-photon parametric amplification in which the nonlinear index of refraction is used to phase match the pump and sidebands. For MI gain the pump wavelength must lie in the anomalous group velocity regime (FIG. 13A) and proper phase matching requires that pump and signal be copropagating. Since in the copropagating configuration pump fluctuations can affect the bit error rate of the system, it is particularly important that a quiet pump such as in FIG. 8–10 be employed.

MI amplifiers can be more efficient than Raman amplifiers because the gain coefficient for MI is about a factor of five larger than for the Raman process, as described by R. H. Stolen, "Nonlinear Properties of Optical Fibers," Chapter 5 in *Optical Fiber Telecommunications*, New York, Academic Press (1979). Both MI and Raman amplification arise from the third order susceptibility $X^{(3)}$ in optical fibers. The real part of $X^{(3)}$, the so-called nonlinear index of refraction $n_2$, is responsible for MI, while the imaginary part of $X^{(3)}$ associated with molecular vibrations corresponds to the Raman gain effect. In fused silica fibers about ⅘ths of the $n_2$ is an electronic, instantaneous nonlinearity caused by ultraviolet resonances, while about ⅕th of $n_2$ arises from Raman-active vibrations (e.g., optical phonons) (see further description in M. N. Islam, *Ultrafast Fiber Switching Devices and Systems*, Cambridge, Cambridge University Press [1992]).

The imaginary part of this latter contribution corresponds to the Raman gain spectrum of FIG. 1.

Parametric amplification is usually inefficient in long fibers due to the requirement for phase-matching. However, MI can act as self-phase-matched because the nonlinear index of refraction is used to phase-match the pump and sidebands. This is particularly true when operating near the zero dispersion wavelength $\lambda_0$ in fibers. MI involves two pump (P) photons that create Stokes (S) and anti-Stokes (A) photons. Consequently, the pump in MI can lie on the short or long wavelength side of the signal (in Raman the pump must always be at a shorter wavelength than the signal). To illustrate the MI gain, consider the gain coefficient as derived in R. H. Stolen and J. E. Bjorkholm, *IEEE J. Quantum Elect.*, QE-18, 1062 (1982):

$$g = \sqrt{(\gamma P)^2 - \left[\left(\frac{\Delta k}{2}\right) + \gamma P\right]^2} \quad (2)$$

The first term under the square root corresponds to the third order nonlinearity that couples the pump photons to the sidebands. The second term corresponds to the phase mismatch between the waves and it consists of two parts: one due to the wave-vector mismatch at the different wavelengths and the other due to the increase in nonlinear index induced by the pump. The nonlinearity parameter is defined as $$\gamma = \frac{\omega}{c} \frac{n_2}{A_{\text{eff}}} = \frac{2\pi}{\lambda} \frac{n_2}{A_{\text{eff}}} \quad (3)$$

Also, assuming that we are operating near the zero dispersion wavelength $\lambda_0$, the propagation constant can be expanded as $$\Delta k = -\frac{\lambda^2}{2\pi c}\left[D + \frac{dD}{d\lambda}(\lambda_p - \lambda_0)\right]\Omega^2 \quad (4)$$

where $$\Omega = f_p - f_s = f_a - f_p \quad (5)$$

Figure 13B:
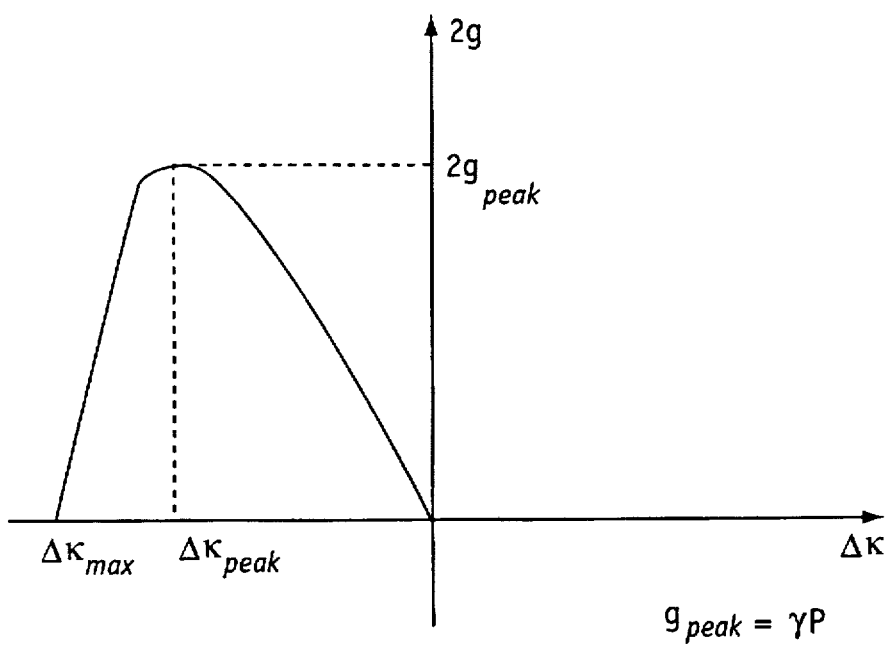
Figure 13C:
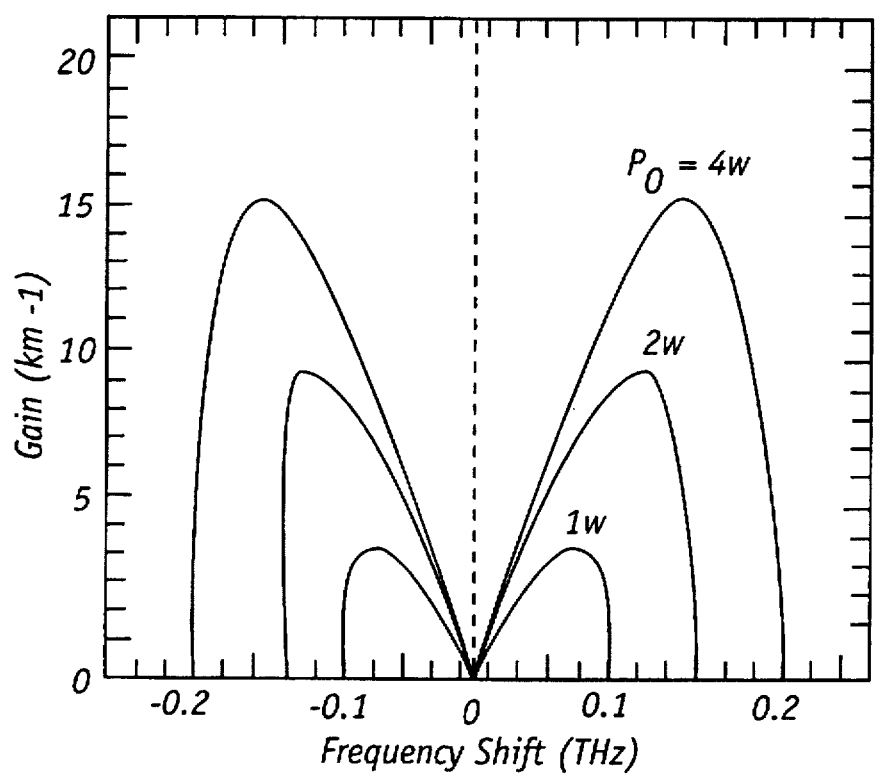

If we are in the anomalous group velocity dispersion regime, then $D>0$, $\partial D/\partial\lambda>0$, $(\gamma_p-\gamma_0)>0$, so that $\Delta k<0$. This is the regime of MI and we see that the nonlinearity helps to reduce the phase mismatch (i.e., the two parts in the second term in equation [2] are of opposite sign). There is gain for MI and the gain is tunable with the pump power. As an example, the power gain coefficient $2g$ is plotted in FIG. 13B for operation in the anomalous group velocity regime. The peak gain ($g_{peak}=\gamma P$) occurs at $\Delta k_{peak}=-2\gamma P$. The range over which the gain exists is given by $0>\Delta k>-4\gamma P$. Thus, we see that the peak gain is proportional to the pump power and the $\Delta k$ range is determined by the pump power. Consequently, from equation (3) we see that the bandwidth can be increased by increasing the pump power, increasing the nonlinear coefficient $n_2$ or decreasing the effective area $A_{\text{eff}}$. Alternately, for a given required frequency range over which gain is required, the pump requirements can be reduced by increasing the effective nonlinearity ($n_2/A_{\text{eff}}$). An example of the pump power dependence of the gain and the double-sided frequency spectrum of the gain is shown in FIG. 13C which is taken from G. P. Agrawal, *Nonlinear Fiber Optics*, 2nd Ed., New York, Academic Press (1995).

Figure 12B:
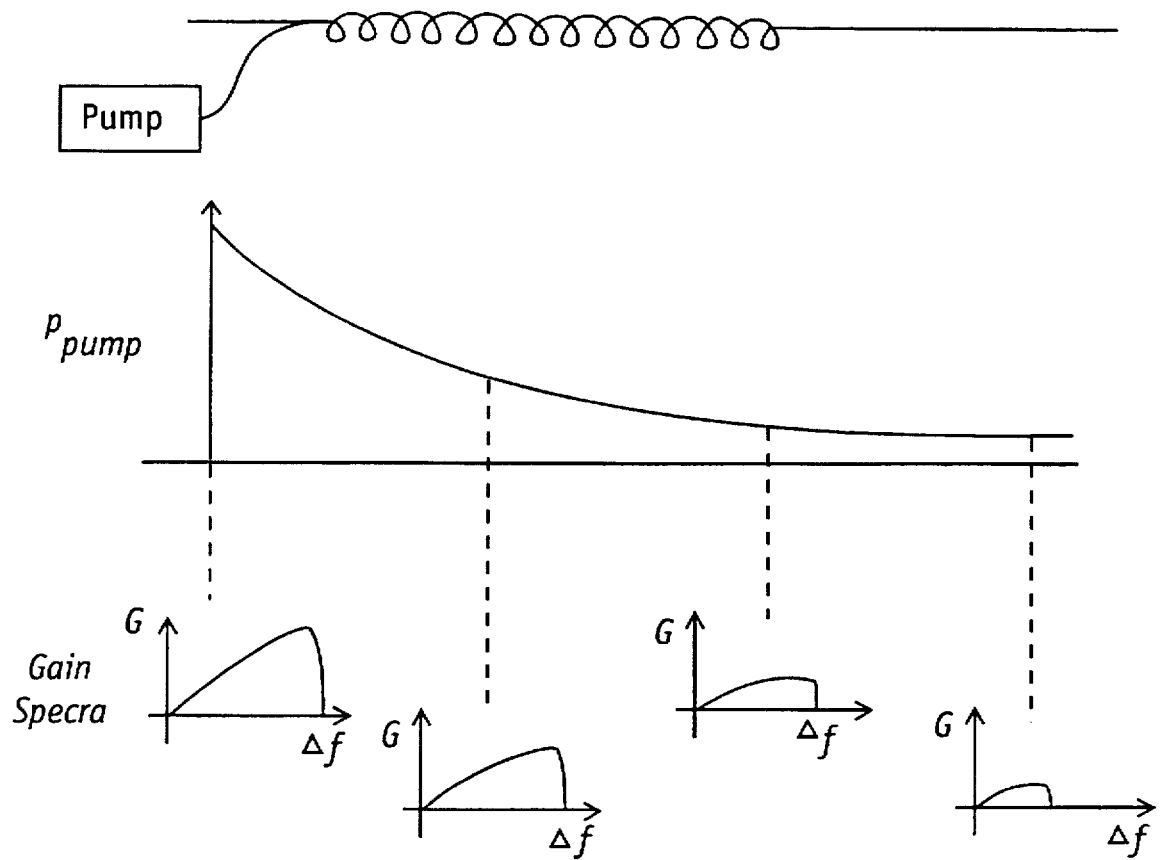

The MI amplifier could be particularly attractive for distributed amplification of ultra-high bit rate soliton transmission systems. As discussed in the last section, distributed amplification and filtering may be required for systems of 40 Gb/s or higher speeds. Mollenauer and coworkers have shown that for soliton-based systems the concept of "sliding-guiding filters" is advantageous. L. F. Mollenauer, J. P. Gordon and S. G. Evangelides, Opt. Lett. 17, 1575 (1992). Specifically, if the center frequency of spectral filters is slid slowly enough, only soliton pulses can follow the filter by shifting their center frequency. This abates any linear dispersive waves and suppresses the noise accumulation. However, the Mollenauer scheme uses discrete amplifiers and filters, which is inappropriate when pulse widths of a few picoseconds or less are employed. On the other hand, the MI-based amplification can effectively provide such a distributed sliding-guiding filter because of the dependence of gain bandwidth on pump intensity. For instance, FIG. 12B illustrates a transmission link where the pump is attenuating due to loss in the fiber and perhaps pump depletion. As the pump intensity decreases, the peak gain frequency also shifts. If the pump is at a lower (higher) frequency than the signal, then the frequency shift is downward (upward). A soliton operating near the peak gain frequency will also shift with the gain spectrum, thus separating the soliton from any noise background.

Broader Implications for Sagnac Raman Devices

Figure 14A:
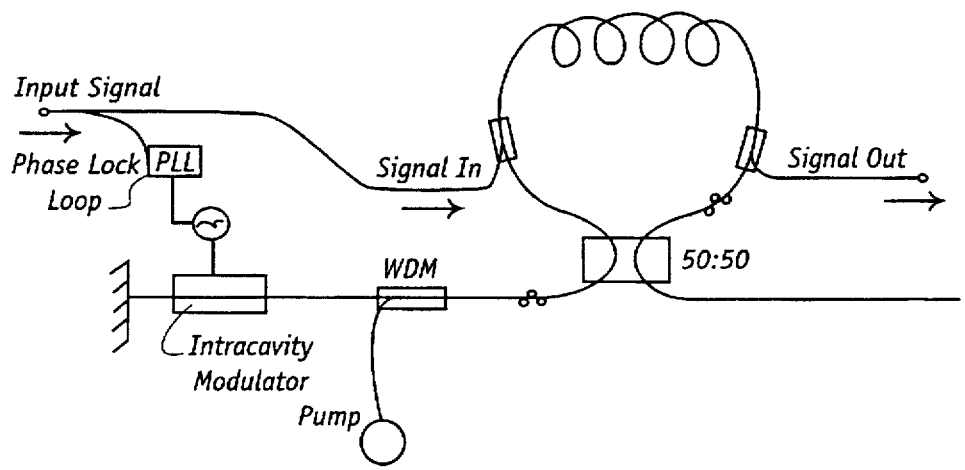
FIGS. 14A–14B illustrate synchronously pumped systems employing the invention.
Figure 14B:
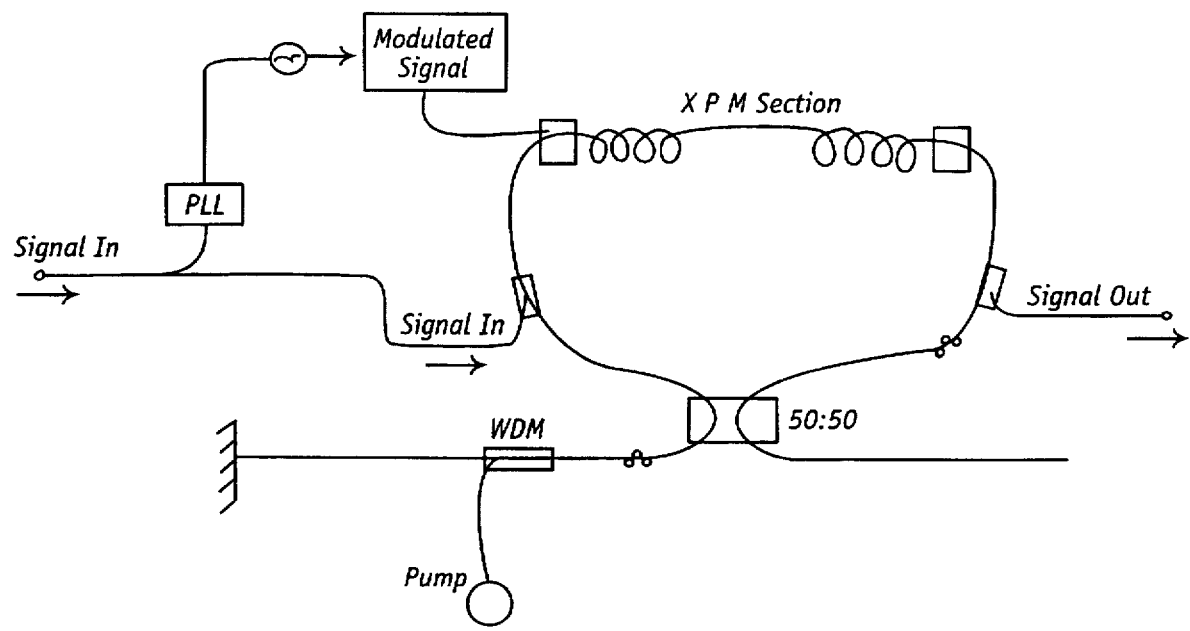

Beyond the inventions and applications based on Sagnac Raman amplifiers and cascade lasers outlined in FIGS. 2–11, there are other extensions of the technology. For example, the same ideas can operate over the entire transparency wavelength range for optical fibers (between 0.3–2 μm). Beyond the above-described applications in telecommunications, there are also applications such as CATV analog systems around 1.3 μm, optical time domain reflectrometer (OTDR) and other such optical instrumentation with enhanced sensitivity and amplification in the system monitor bands around 1.51 μm and 1.6 μm. Also, a synchronously-pumped Sagnac Raman cascade laser could be used to reduce the average pump power requirements. In FIG. 14A an intracavity modulator is introduced that is driven by electronics synchronized to the input using a phase-lock loop. Alternately, in FIG. 14B cross-phase modulation in the fiber ring is introduced by using a modulation laser that is synchronized to the input stream. Depending on the bit rate of the signal, the electric option of FIG. 14A or the all-optical option of FIG. 14B may be more attractive.

Figure 15A:
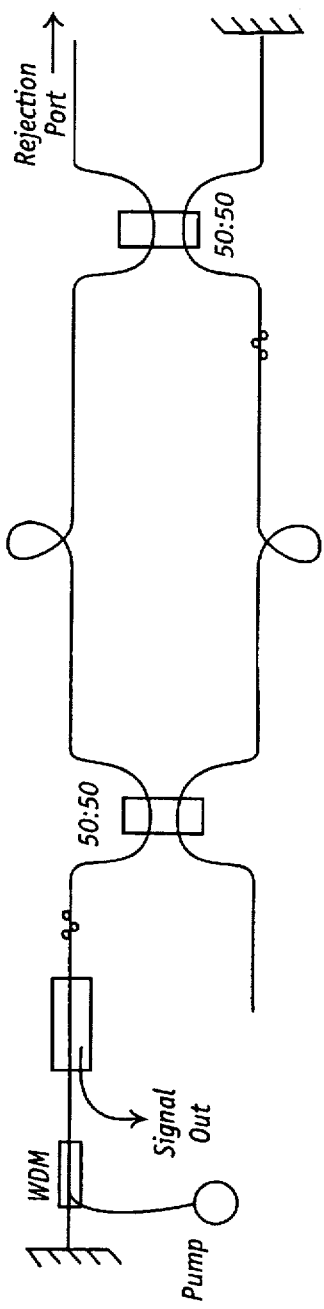
FIGS. 15A and 15B illustrate the invention implemented as a Mach-Zehnder interferometer.
Figure 15B:
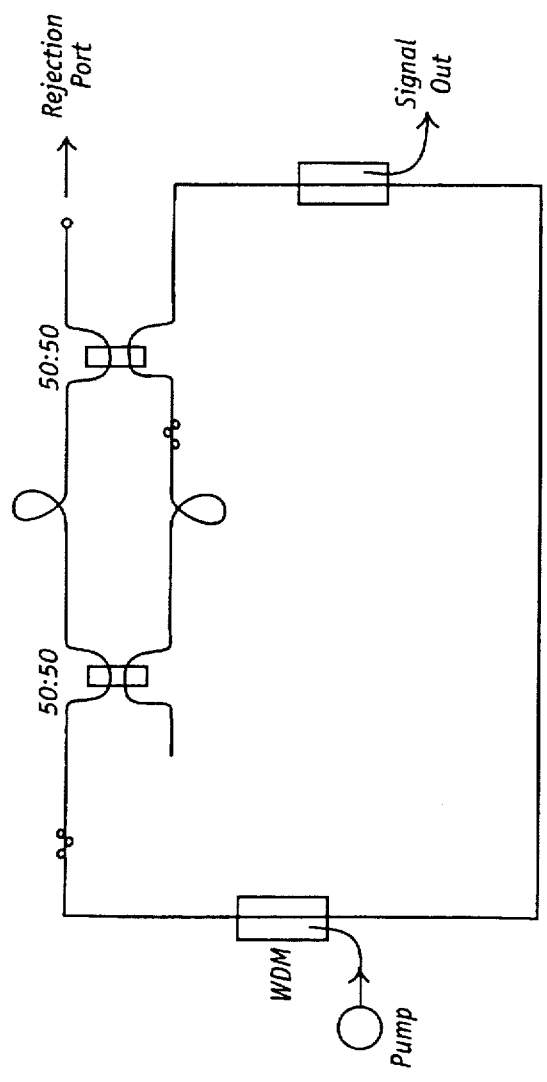
Figure 15C:
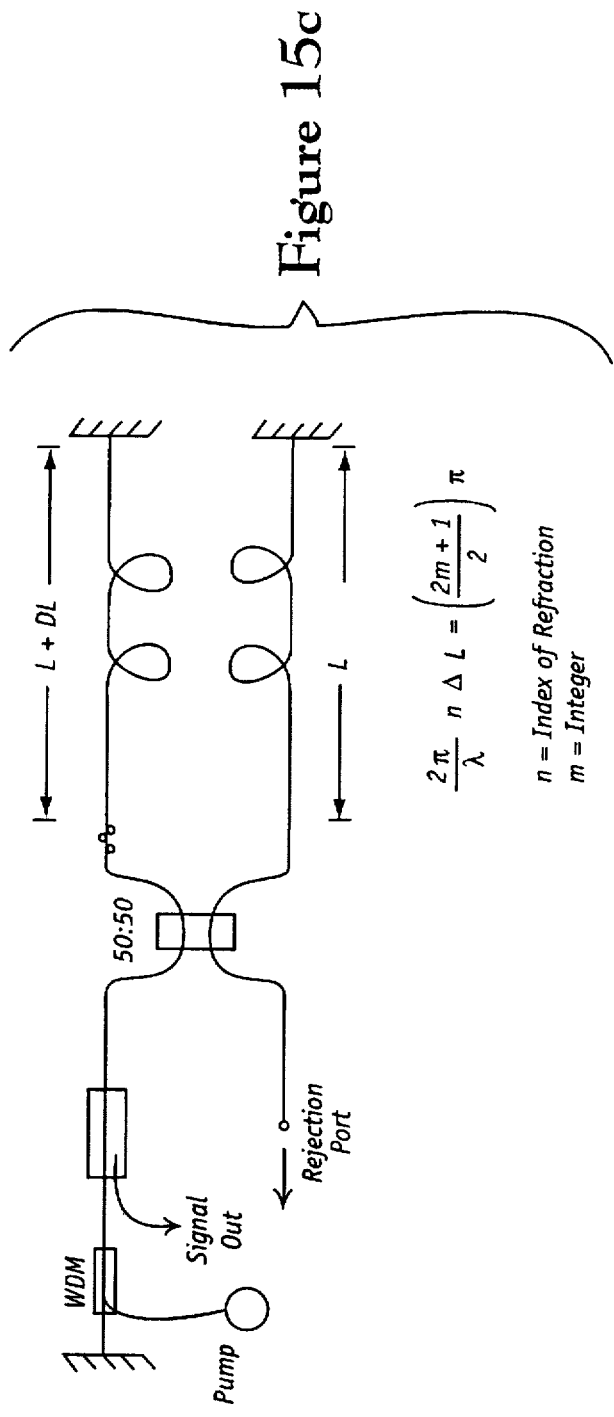
FIG. 15C illustrates the invention employing a Michelson interferometer.
Figure 15D:
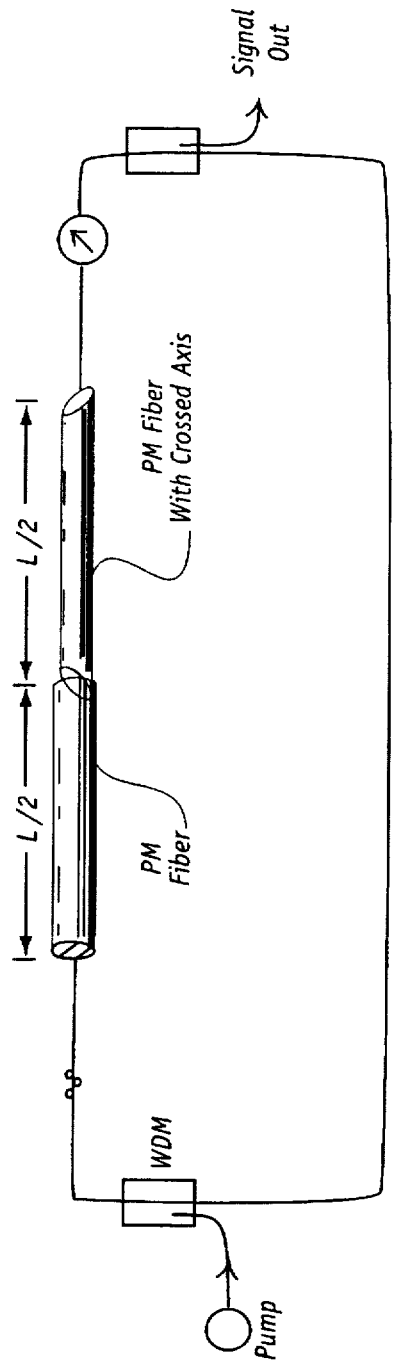
FIG. 15D illustrates the invention employing an interferometer using two arms of a polarization-maintaining (PM) fiber.
Figure 15E:
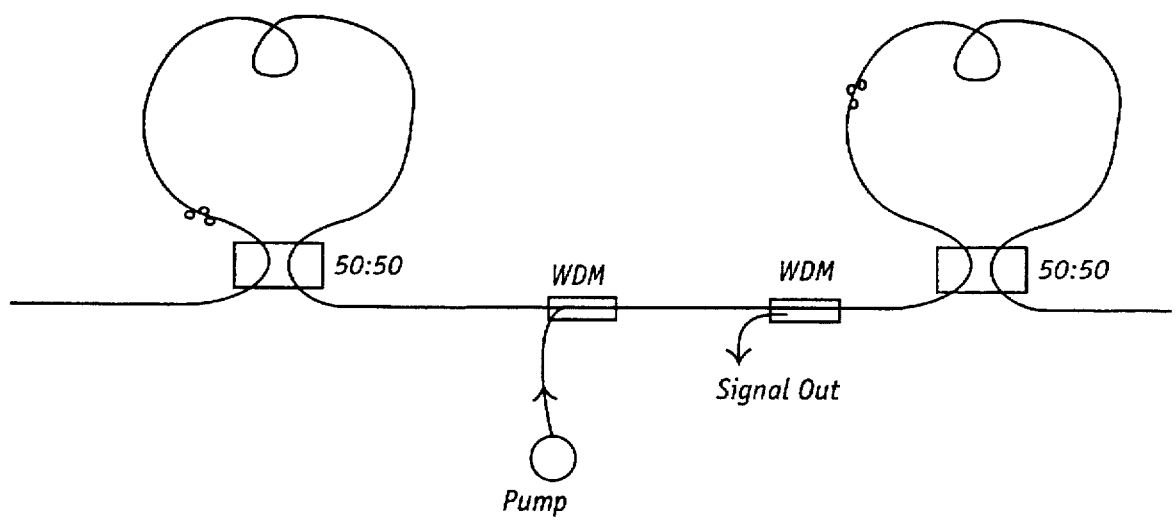
FIG. 15E illustrates the invention employing two Sagnac loop mirrors connected with a linear region.
Figure 15F:
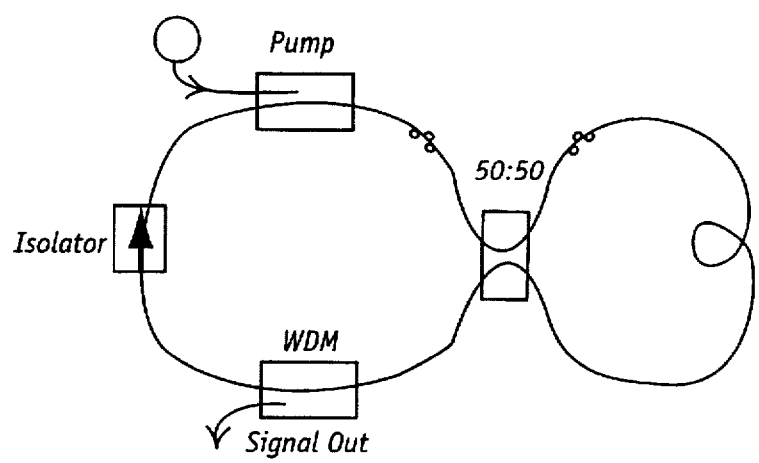
FIG. 15F illustrates the invention implemented using a figure-eight laser configuration.

The basic configuration of the Sagnac loop may also be generalized for the Raman amplifiers or lasers. For example, the Sagnac interferometer can be replaced with Mach-Zehnder interferometer or Michelson interferometer. FIG. 15A and 15B show two different embodiments of a Mach-Zehnder interferometer. Each arm of the interferometer is of the same length. If desired, these embodiments could be implemented using optical wave guides, such as wave guides that are fabricated upon a silicon substrate. FIG. 15C illustrates a Michelson interferometer embodiment. Note that the two arms of the interferometer are of different lengths, corresponding to the equations set forth in the figure. Also in the case of a pulsed system, the interferometer could also be time-multiplexed over the same fiber. Alternately, two arms of the interferometer can be the two polarizations in a polarization maintaining fiber. This is shown in FIG. 15D. A polarization-maintaining (PM) fiber defines the two optical paths within the same fiber, the paths being essentially orthogonal to one another. An adjustable polarizer discriminates between these two paths and serves as the rejection mechanism for the difference mode signals. Note that the polarization-maintaining fiber is configured in two sections with the axis crossed at the halfway point. This will undo any effects of walkoff due to birefringence in the PM fiber. Note that in this embodiment the polarizer functions as the signal comparator in place of the coupler used in other embodiments. Further embodiments include the embodiments illustrated in FIGS. 15E and 15F. In FIG. 15E, the end mirror on the left side of the resonant cavity may be replaced with another Sagnac interferometer, in which case the configuration would be two loops connected with a linear region or a figure eight laser configuration. The figure eight configuration is shown in FIG. 15F. In this embodiment the isolator allows optical signals to pass in only one direction. The isolator thus serves as the rejection mechanism, comparable in function to the rejection port of other embodiments described above. Furthermore, all of these configurations can benefit from improvements with higher pump power and fibers with higher Raman cross-section and smaller affective area. Also, fibers with various dopings or appropriate polarization properties could be advantageous. For example, DEDFAs or Tm-doped fibers may be particularly attractive in applications requiring distributed pulse control or filtering. M. N. Islam and L. Rahman, *IEEE J. Lightwave Tech.* 12, 1952 (1994).

While the present invention has been described in a number of different exemplary embodiments, it will be understood that the principles of the invention can be extended to still further embodiments and that the embodiments illustrated here are not intended to limit the scope of the invention as set forth in the appended claims.

What is claimed is:

1. In an optical resonator having at least two reflectors and port for coupling to a source of light and an output, the improvement comprising:

at least a first one of said reflectors comprising a distributed gain medium;

said distributed gain medium producing optical signal gain through nonlinear polarization that cascades through plural orders of wavelength including a first order and at least one higher order;

said first reflector further defining two optical paths configured to support both common mode and difference mode optical signals; and said first reflector having a higher reflectance for common mode signals than for difference mode signals such that difference mode signals corresponding to said higher order are at least partially rejected thereby reducing amplification of fluctuations.

2. The resonator of claim 1 wherein said distributed gain medium comprising a material that produces optical signal gain by virtue of third order nonlinearities within the material and characterized by being proportional to the instantaneous intensity of light propagating through said medium.

3. The resonator of claim 1 wherein said distributed gain medium produces an optical wavelength shift with each of said plural orders such that the optical wavelength at said output is longer than the optical wavelength of said source.

4. The resonator of claim 1 wherein material produces said optical signal gain through optically stimulated vibrational modes or electronic transitions within the material.

5. The resonator of claim 1 wherein said port is coupled to a source of light of sufficient intensity such that said distributed gain medium produces Raman gain.

6. The resonator of claim 1 wherein said one of said reflectors comprises a Sagnac interferometer.

7. The resonator of claim 1 wherein said one of said reflectors comprises a Sagnac interferometer fabricated from said distributed gain medium.

8. The resonator of claim 1 wherein said distributed gain medium is an optical fiber.

9. The resonator of claim 1 wherein said optical resonator is configured as an optical signal amplifier and further includes at least one signal input port.

10. The resonator of claim 1 wherein said first reflector includes a coupler that establishes said two optical paths.

11. The resonator of claim 1 wherein said first reflector comprises a coupler that establishes said two optical paths and an optical fiber system connected to said coupler to support said signal propagation along both paths.

12. The resonator of claim 1 wherein said first reflector comprises a coupler that establishes said two optical paths and an optical fiber loop connected to said coupler to support said signal propagation along both clockwise and counter-clockwise paths within said optical fiber.

13. The resonator of claim 1 wherein said first reflector includes a coupler that establishes said two optical paths, said coupler functioning as an optical signal comparator that reflects common mode signals and at least partially rejects difference mode signals.

14. The resonator of claim 1 wherein said first reflector includes a coupler having a predefined coupling ratio that establishes said two optical paths.

15. The resonator of claim 14 wherein said predefined coupling ratio is 50:50.

16. The resonator of claim 14 wherein said predefined coupling ratio is an unequal coupling ratio.

17. The resonator of claim 1 wherein said first reflector includes a dichroic coupler having a first predefined coupling ratio at a first wavelength and a second predefined coupling ratio at a second wavelength, said dichroic coupler establishing said two optical paths.

18. The resonator of claim 1 wherein said optical resonator is configured as an optical signal amplifier and further includes at least one signal input port disposed between said two reflectors.

19. The resonator of claim 1 wherein a second one of said reflectors comprises at least one grating reflector that provides maximum reflectivity at a predetermined wavelength.

20. The resonator of claim 1 further comprising at least one wavelength filter disposed between said two reflectors for selecting predefined pump orders.

21. The resonator of claim 1 wherein said resonator functions as a cascade laser.

22. The resonator of claim 21 wherein said cascade laser is coupled to an optical system to provide pumping of an erbium-doped fiber amplifier.

23. The resonator of claim 21 wherein said cascade laser is coupled to an optical system to provide pumping of a distributed erbium-doped fiber amplifier system.

24. The resonator of claim 21 wherein said cascade laser is coupled to an optical fiber link to provide distributed gain.

25. The resonator of claim 1 further comprising a plurality of said resonators, wherein each of said resonators is configured to function as a cascade laser and each is coupled to an optical fiber link to provide distributed gain.

26. The resonator of claim 1 wherein said resonator is tuned to a modulation instability (MI) peak.

27. The resonator of claim 1 wherein said distributed gain medium comprises a material that produces optical signal gain by virtue of nonlinear index of refraction within the material.

28. The resonator of claim 1 wherein said first reflector includes an optical comparator for discriminating between common mode and difference mode signals.

29. The resonator of claim 28 wherein said comparator comprises an optical coupler.

30. The resonator of claim 28 wherein said distributed gain medium is a polarization maintaining fiber and said comparator comprises a polarizer.

31. The resonator of claim 1 wherein said first reflector comprises first and second optical waveguides defining two optical paths, said waveguides being coupled to an optical splitter and to an optical comparator to support common mode and difference mode optical signals.

32. The resonator of claim 31 wherein at least one of said waveguides comprises optical fiber.

33. The resonator of claim 31 wherein at least one of said waveguides is formed on a substrate.

34. The resonator of claim 1 further comprising means for synchronously pumping said resonator that includes electrical or optical signal feedback to establish synchronization.

35. In an optical resonator having at least two reflectors and port for coupling to a source of light and an output, the improvement comprising:

at least a first one of said reflectors comprising a distributed gain medium;

said distributed gain medium producing optical signal gain through nonlinear polarization;

said first reflector further defining two optical paths configured to support both common mode and difference mode optical signals; and said first reflector having a higher reflectance for common mode signals than for difference mode signals such that said difference mode signals are at least partially rejected.

36. The resonator of claim 35 wherein said distributed gain medium comprising a material that produces optical signal gain by virtue of third order nonlinearities within the material and characterized by being proportional to the instantaneous intensity of light propagating through said medium.

37. The resonator of claim 35 wherein said distributed gain medium produces an optical wavelength shift with each of said plural orders such that the optical wavelength at said output is longer than the optical wavelength of said source.

38. The resonator of claim 35 wherein material produces said optical signal gain through optically stimulated vibrational modes or electronic transitions within the material.

39. The resonator of claim 35 wherein said port is coupled to a source of light of sufficient intensity such that said distributed gain medium produces Raman gain.

40. The resonator of claim 35 wherein said one of said reflectors comprises a Sagnac interferometer.

41. The resonator of claim 35 wherein said one of said reflectors comprises a Sagnac interferometer fabricated from said distributed gain medium.

42. The resonator of claim 35 wherein said distributed gain medium is an optical fiber.

43. The resonator of claim 35 wherein said optical resonator is configured as an optical signal amplifier and further includes at least one signal input port.

44. The resonator of claim 35 wherein said first reflector includes a coupler that establishes said two optical paths.

45. The resonator of claim 35 wherein said first reflector comprises a coupler that establishes said two optical paths and an optical fiber system connected to said coupler to support said signal propagation along both paths.

46. The resonator of claim 35 wherein said first reflector comprises a coupler that establishes said two optical paths and an optical fiber loop connected to said coupler to support said signal propagation along both clockwise and counter-clockwise paths within said optical fiber.

47. The resonator of claim 35 wherein said first reflector includes a coupler that establishes said two optical paths, said coupler functioning as an optical signal comparator that reflects common mode signals and at least partially rejects difference mode signals.

48. The resonator of claim 35 wherein said first reflector includes a coupler having a predefined coupling ratio that establishes said two optical paths.

49. The resonator of claim 48 wherein said predefined coupling ratio is 50:50.

50. The resonator of claim 48 wherein said predefined coupling ratio is an unequal coupling ratio.

51. The resonator of claim 35 wherein said first reflector includes a dichroic coupler having a first predefined coupling ratio at a first wavelength and a second predefined coupling ratio at a second wavelength, said dichroic coupler establishing said two optical paths.

52. The resonator of claim 35 wherein said optical resonator is configured as an optical signal amplifier and further includes at least signal one input port disposed between said two reflectors.

53. The resonator of claim 35 therein a second one of said reflectors comprises at least one grating reflector that provides maximum reflectivity at a predetermined wavelength.

54. The resonator of claim 35 further comprising at least one wavelength filter disposed between said two reflectors for selecting predefined pump orders.

55. The resonator of claim 35 wherein said resonator functions as a cascade laser.

56. The resonator of claim 55 wherein said cascade laser is coupled to an optical system to provide pumping of an erbium-doped fiber amplifier.

57. The resonator of claim 55 wherein said cascade laser is coupled to an optical system to provide pumping of a distributed erbium-doped fiber amplifier system.

58. The resonator of claim 55 wherein said cascade laser is coupled to an optical fiber link to provide distributed gain.

59. The resonator of claim 35 further comprising a plurality of said resonators, wherein each, of said resonators is configured to function as a cascade laser and each is coupled to an optical fiber link to provide distributed gain.

60. The resonator of claim 35 wherein said resonator is tuned to a modulation instability (MI) peak.

61. The resonator of claim 35 wherein said distributed gain medium comprises a material that produces optical signals gain by virtue of nonlinear index of refraction within the material.

62. The resonator of claim 35 wherein said first reflector includes an optical comparator for discriminating between common mode and difference mode signals.

63. The resonator of claim 62 wherein said comparator comprises an optical coupler.

64. The resonator of claim 62 wherein said distributed gain medium is a polarization maintaining fiber and said comparator comprises a polarizer.

65. The resonator of claim 35 wherein said first reflector comprises first and second optical waveguides defining two optical paths, said waveguides being coupled to an optical splitter and to an optical comparator to support common mode and difference mode optical signals.

66. The resonator of claim 65 wherein at least one of said waveguides comprises optical fiber.

67. The resonator of claim 65 wherein at least one of said waveguides is formed on a substrate.

68. The resonator of claim 35 further comprising means for synchronously pumping said resonator that includes electrical or optical signal feedback to establish synchronization.

69. An optical resonator, comprising:

at least two reflectors defining a laser cavity;

wherein at least a first one of said reflectors is an interferometer comprising a distributed gain medium that produces gain based on nonlinear polarization inherent to the medium; and wherein said interferometer includes an optical comparator having plural input ports coupled to said distributed gain medium.

70. The optical resonator of claim 69 wherein said interferometer includes an optical comparator for discriminating between common mode and difference mode signals and a mechanism for rejecting at least partially said difference mode signals.

71. The optical resonator of claim 69 wherein said comparator produces sum and difference optical signals based on signals supplied by said distributed gain medium.

72. The optical resonator of claim 71 wherein said comparator includes a rejection port for rejecting at least a portion of said difference optical signals.

73. The optical resonator of claim 69 wherein said interferometer is comprised of optical fiber.

74. The optical resonator of claim 69 wherein said interferometer comprises plural optical waveguides.

75. The optical resonator of claim 69 wherein said interferometer is a Sagnac interferometer.

76. The optical resonator of claim 69 wherein said interferometer supports both common mode and difference mode optical signals and has higher reflectance for said common mode than for said difference mode.

77. The optical resonator of claim 69 wherein said distributed gain medium produces optical signal gain through nonlinear polarization that cascades through plural orders of wavelength, including a first order and at least one higher order; and wherein said inteferometer supports both common mode and difference mode optical signals and includes a rejection port for at least partially rejecting difference mode signals corresponding to said higher order.

78. An optical resonator, comprising:

at least two reflectors defining a laser cavity;

wherein at least a first one of said reflectors is an interferometer comprising a distributed gain medium that produces gain based on nonlinear polarization inherent to the medium; and wherein said interferometer includes an optical comparator for discriminating between common mode and difference mode signals and a mechanism for rejecting at least partially said difference mode signals.

79. An optical resonator, comprising:

at least two reflectors defining a laser cavity;

wherein at least a first one of said reflectors is an interferometer comprising a distributed gain medium that produces gain based on nonlinear polarization inherent to the medium; and wherein said comparator produces sum and difference optical signals based on signals supplied by said distributed gain medium.

80. An optical resonator, comprising:

at least two reflectors defining a laser cavity;

wherein at least a first one of said reflectors is an interferometer comprising a distributed gain medium that produces gain based on nonlinear polarization inherent to the medium; and wherein said comparator includes a rejection port for rejecting at least a portion of said difference optical signals.

81. An optical resonator, comprising:

at least two reflectors defining a laser cavity;

wherein at least a first one of said reflectors is an interferometer comprising a distributed gain medium that produces gain based on nonlinear polarization inherent to the medium; and wherein said interferometer supports both common mode and difference mode optical signals and has higher reflectance for said common mode than for said difference mode.

82. An optical resonator, comprising:

at least two reflectors defining a laser cavity;

wherein at least a first one of said reflectors is an interferometer comprising a distributed gain medium that produces gain based on nonlinear polarization inherent to the medium; and wherein said distributed gain medium produces optical signal gain through nonlinear polarization that cascades through plural orders of wavelength, including a first order and at least one higher order; and wherein said interferometer supports both common mode and difference mode optical signals and includes a rejection port for at least partially rejecting difference mode signals corresponding to said higher order.

* * * * *